United States Patent [19]

Yamamoto et al.

[11] Patent Number: 4,962,387

[45] Date of Patent: Oct. 9, 1990

[54] THERMAL TRANSFER PRINTING APPARATUS

[75] Inventors: Junichi Yamamoto; Yoshio Tohyama; Masahiro Shiigi, all of Osaka, Japan

[73] Assignee: Minolta Camera Kabushiki Kaisha, Osaka, Japan

[21] Appl. No.: 355,669

[22] Filed: May 23, 1989

[30] Foreign Application Priority Data

May 24, 1988 [JP] Japan ................................ 63-127658
Jun. 1, 1988 [JP] Japan ................................ 63-136456

[51] Int. Cl.[5] ......................... G01D 15/10; B41J 35/04

[52] U.S. Cl. ................................ 346/76 PH; 400/120; 400/185; 400/248

[58] Field of Search .................... 346/76 PH; 400/120, 400/185, 248

[56] References Cited

U.S. PATENT DOCUMENTS

| | | | |
|---|---|---|---|
| 4,505,603 | 3/1985 | Yana | 400/120 |
| 4,625,218 | 11/1986 | Watanabe | 346/76 PH |
| 4,642,656 | 2/1987 | Shibuya et al. | 346/76 PH |
| 4,739,341 | 4/1988 | Matsuno et al. | 346/1.1 |
| 4,784,502 | 11/1988 | Kobayashi | 400/248 |

FOREIGN PATENT DOCUMENTS 60-32687 2/1985 Japan .

*Primary Examiner*—Bruce A. Reynolds
*Assistant Examiner*—Gerald E. Preston
*Attorney, Agent, or Firm*—Burns, Doane, Swecker & Mathis

[57] ABSTRACT

A multi-color thermal transfer printing apparatus having a platen roller rotatable in opposite directions with a recording medium driven to travel on the platen roller and a continuous length of carrier medium driven to travel in conjunction with the recording medium on the platen roller so that the carrier medium may be in contact with the recording medium, the carrier medium having a series of areas carrying differently colored inks. A thermal print head is movable between an inoperative position spaced apart from the platen roller and an operative position having the carrier medium pressed against the recording medium on the platen roller and operative to form an image on the recording medium by thermal transfer of an ink from one of the colored areas of the carrier medium to the recording medium. A guide member is movable between a first position close to the platen roller and a second position spaced from the platen roller, the guide member in the first position forming a passageway through which the recording medium is to be guided to travel along a predetermined path with respect to the platen roller. The guide member and the print head are together so that the guide member is moved to the first position in response to movement of the print head to the inoperative position and is moved to the second position in response to movement of the print head to the operative position.

17 Claims, 9 Drawing Sheets

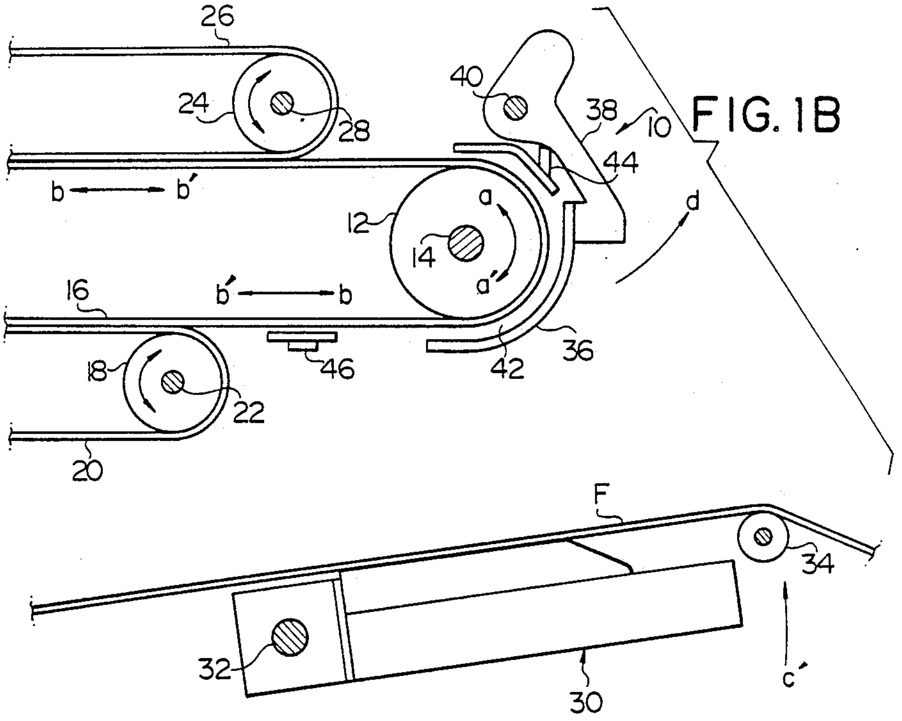
FIG. 1B
FIG. 2
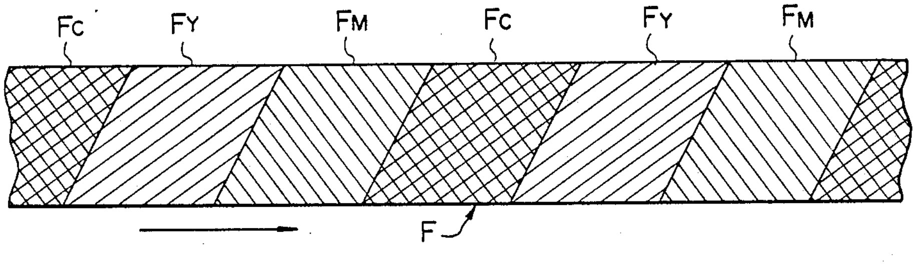

THERMAL TRANSFER PRINTING APPARATUS

FIELD OF THE INVENTION

The present invention relates to a printing apparatus of the thermal transfer type and, more particularly, to a multi-color thermal transfer printing apparatus.

BACKGROUND OF THE INVENTION

A multi-color thermal transfer printing apparatus of the type to which the present invention generally appertains has an elongated thermal print head positioned close to and in parallel with a platen roller. During operation of such a printing apparatus, a recording medium such as typically a sheet of paper and a continuous length of ink film are held in contact with each other on the peripheral surface of the platen roller by means of the print head. The ink film has carried thereon a thin layer of thermally fusible image transfer materials or inks of different colors. The thermal print head has a multiplicity of heater elements which are seleetively activated responsive to a set of image signals supplied from any image scanning or image data supply means. A multi-colored image represented by the signals thus supplied to the print head is formed on the recording medium by the pixels of differently colored inks transferred to the surface of the recording medium.

The image transfer materials or inks carried on the ink film are colored in, for example, yellow, magenta and cyan or yellow, magenta, cyan and black. These differently colored inks are applied in a succession of distinct areas arranged to recur along the length of the ink film and each coextensive with the recording medium on which a multi-colored image is to be reproduced. During printing operation for a single recording medium, the ink film is driven to endwise travel between supply and takeup reels so that adjacent three or four of the differently colored areas are successively brought into registry with the recording medium. Pixels of a single color which are to form part of the multi-colored image to be finally reproduced are thus formed on the recording medium by transfer of an ink from each of the three or four adjacent color areas of the ink film. The whole multi-colored image is in this manner formed on the single recording medium in three or four consecutive cycles of image transfer operation.

A typical example of a thermal transfer printing apparatus of the described type is disclosed in Japanese Provisional Patent Publication (Kokai) No. 60-32687. In a prior-art thermal transfer printing apparatus taught in this Publication, the platen roller is first turned to move a recording medium forwardly from a predetermined print-start position with respect to the platen roller and thereby form pixels of one color on the recording medium. On termination of the printing operation in the one color, the platen roller is driven to turn in the reverse direction to move the recording medium back to the initial print-start position for the formation of pixels of another color on the recording medium. During movement of the recording medium back to the initial print-start position, the thermal print head of the apparatus is spaced apart from the platen roller so as to allow the recording medium to move freely with respect to the print head.

For the formation of a multi-colored image on a single recording medium in this prior-art printing apparatus, the recording medium is thus first moved to the print-start position having its leading edge held in contact with the peripheral surface of the platen roller. The platen roller is then driven to turn in forward direction so that pixels of, for example, yellow are printed on the recording medium. The yellow-colored pixels are formed on the recording medium with the print head held in pressing contact with the platen roller across a yellow-colored area of the ink film moving with the recording medium on the peripheral surface of the platen roller.

After a yellow-colored component of the whole multi-colored image to be finally reproduced is thus formed on the recording medium, the print head is moved away from the platen roller and the platen roller is driven to turn in the reverse direction to move the recording medium back to the initial print-start position having its leading edge located between the platen roller and platen roller. The ink film is driven to endwise move a predetermined distance so that the magenta-colored area immediately subsequent to the yellow-colored area which has just been used is to be in registry with the recording medium. The print head is then moved into pressing contact with the platen roller across the recording medium and the magenta-colored area of the ink film.

The platen roller is then driven to turn in the forward direction for a second time so that magenta-colored pixels are printed on the recording medium. On the recording medium is thus formed a magenta-colored component of the whole multicolored image in addition to the yellow-colored component of the whole image. The print head is then moved away from the platen roller for a second time and the recording medium is moved back to the print-start position for a third time, while the ink film is driven to further move to a position in which the cyan-colored area subsequent to the magenta-colored area which has just been used is to be in registry with the recording medium. With the platen roller driven to turn in the forward direction, there is formed on the recording medium a cyan-colored component of the whole multi-colored image i addition to the yellow-colored and magenta-colored components of the whole image. A multi-colored image composed of yellow-, magenta- and cyan-colored pixels is in this fashion printed on a recording medium in three consecutive cycles of printing operation using three adjacent colored areas of an ink film.

In the prior-art thermal transfer printing apparatus of the described character, extra arrangement is made so that a trailing edge portion of the recording medium is pressed against the peripheral surface of the platen roller when the print head is spaced apart from the platen roller upon termination of the first or second cycle of printing operation. This arrangement is desirable for enabling the recording medium to reliably stay on the platen roller and to accurately move back to the initial print-start position with the print head spaced apart from the platen roller.

Such extra arrangement of the prior-art printing apparatus includes a pressing roller located to be engageable with a trailing end portion of a recording medium moved to the position with which a cycle of printing operation using a colored area of the ink film is to be terminated. A problem has however resulted from this arrangement in that the presence of the pressing roller on the trailing end portion of the recording medium reduces the coverage which the print head is allowed to have for printing each of the single colored components of a multi-colored image on the recording medium.

Another example of a multi-color thermal transfer printing apparatus of the type to which the present invention appertains is disclosed in U.S. Pat. No. 4,505,603. In a thermal transfer printing apparatus taught in this issued Patent, the thermal print head is arranged to be pivotally movable toward and away from an angular position operative to hold a recording medium and an ink film in contact with the peripheral surface of the platen roller. The platen roller in this prior-art thermal transfer printing apparatus is also driven to turn in forward direction to move a recording medium forwardly from a predetermined print-start position and form pixels of one color on the recording medium. After pixels of the one color are thus printed on the recording medium, the platen roller is driven to turn in the reverse direction to move the recording medium back to the initial print-start position for the printing of pixels of another color on the recording medium. The thermal print head of the apparatus is angularly spaced apart from the platen roller during backward movement of the recording medium and is pivotally moved into contact with the platen roller across the recording medium and ink film before the printing of the pixels of another color is started.

In the prior-art thermal transfer printing apparatus of this type, the recording medium and ink film are held together temporarily after the ink film is released from the thermal print head. This is useful for the stable and uniform transfer of ink from the ink film to the recording medium and is effected by means of a pinch roller located in conjunction with the path of the ink film leaving the platen roller. Past the pinch roller, the ink film which has been firmly attached to the recording medium moving forwardly from the platen roller is forced to move away from the recording medium and is thus separated from the recording medium.

The recording medium and ink film being thus held together for some time after the ink film has been released from the print head, pixels of any color can thus be transferred stably and uniformly from the ink film to the recording medium. This advantage of the prior-art printing apparatus is however impaired by the fact that the recording medium which has once been stripped from the ink film may be accidentally brought into contact with the ink film and stained with an ink objectionably transferred from the ink film while the recording medium is being moved back to the initial print-start position.

It may also be taken into account that the coefficient of friction of the image-carrying surface of a recording medium stepwise increases each time the recording medium encounters a cycle of printing operation and a single-colored component of a multi-colored image is printed thereon. If it happens that the recording medium being moved back to the initial printstart position is brought into contact with the ink film, the recording medium may be hindered from being moved smoothly toward the print-start position and may thus be caused to move irregularly with respect to the platen roller. This may result in deviation of the recording medium from its proper path of movement with respect to the platen roller and in failure in achieving exact registration between the individual single-colored components of the multi-colored image finally printed on the recording medium.

It may be further pointed out that the ink film allowed to remain on the recording medium after the ink film has been released from the print head is electrostatically attracted to the recording medium and may thus be caused to move with the recording medium after the ink film should have been separated from the recording medium. This would invite an occurrence of a jamming of the ink film and accordingly in a failure of the apparatus to operate properly.

SUMMARY OF THE INVENTION

It is, accordingly, an important object of the present invention to provide an improved multi-color thermal transfer printing apparatus wherein a recording medium on which a multi-colored image is to be printed is enabled to reliably stay on the platen roller and to accurately move back to the initial print-start position after the print head is spaced apart from the platen roller.

It is another important object of the present invention to provide an improved multi-color thermal transfer printing apparatus in which not only the recording medium is enabled to reliably stay on the platen roller and move back to the initial print-start position but the thermal print head is allowed to form a multi-colored image throughout the entire area of the recording medium.

It is still another important object of the present invention to provide an improved multi-color thermal transfer printing apparatus in which the ink film is allowed to remain on a recording medium for some time after the ink film has been released from the print head so that pixels of any color can be transferred stably and uniformly from the ink film to the recording medium.

It is still another important object of the present invention to provide an improved multi-color thermal transfer printing apparatus in which the ink film allowed to remain on a recording medium temporarily after the ink film has been released from the print head is assuredly isolated from the recording medium and is prevented from being accidentally brought into contact with the recording medium while the recording medium is being moved back to the initial print-start position with respect to the platen roller.

Thus, it is still another important object of the present invention to provide an improved multi-color thermal transfer printing apparatus in which the recording medium being moved back to the initial print-start position upon termination of each cycle of printing operation is prevented from being stained with an ink which would otherwise be objectionably transferred from the ink film to the recording medium.

It is still another important object of the present invention to provide an improved multi-color thermal transfer printing apparatus in which the recording medium is enabled to move smoothly and correctly to the print-start position upon termination of each cycle of printing operation.

It is, yet, still another important object of the present invention to provide an improved multi-color thermal transfer printing apparatus precluding an occurrence of a jamming of the ink film as might be otherwise caused during backward movement of the recording medium to the print start-position upon termination of each cycle of printing operation.

In accordance with one outstanding aspect of the present invention, there is provided a thermal transfer printing apparatus comprising (a) a platen roller rotatable about a fixed axis of rotation in a first direction and a second direction opposite to the first direction, (b) first feeding means for feeding a recording medium on the platen roller, (c) second feeding means for feeding a continuous length of carrier medium in conjunction with the recording medium on the platen roller so that the carrier medium may be in contact with the recording medium, the carrier medium having a succession of colored areas carrying differently colored inks, (d) a thermal print head movable between an inoperative position spaced apart from the platen roller and an operative position having the carrier medium pressed against the recording medium on the platen roller and operative to form an image on the recording medium by thermal transfer of an ink from one of the colored areas of the carrier medium to the recording medium, (e) a guide member movable between a first position close to the platen roller and a second position spaced apart from the platen roller, the guide member in the first position forming a passageway through which the recording medium is to be guided to travel along a predetermined path with respect to the platen roller, and (f) means for coupling the guide member and the thermal print head together so that the guide member is moved to the first position in response to movement of the thermal print head to the inoperative position and is moved to the second position in response to movement of the thermal print head to the operative position.

In a thermal transfer printing apparatus thus constructed and arranged in accordance with the first outstanding aspect of the present invention, the guide member is preferably operative to intervene between the recording medium and the carrier medium for separating the recording medium and carrier medium from each other when moved from the second position to the first position.

In accordance with another outstanding aspect of the present invention, there is provided a thermal transfer printing apparatus comprising (a) a platen roller rotatable about a fixed axis of rotation in a first direction and a second direction opposite to the first direction, (b) first feeding means for feeding a recording medium on the platen roller, (c) second feeding means for feeding a continuous length of carrier medium in conjunction with the recording medium on the platen roller so that the carrier medium may be in contact with the recording medium, the carrier medium having a succession of colored areas carrying differently colored inks, (d) a thermal print head movable between an inoperative position spaced apart from the platen roller and an operative position having the carrier medium pressed against the recording medium on the platen roller and operative to form an image on the recording medium by thermal transfer of an ink from one of the colored areas of the carrier medium to the recording medium, (e) a guide member movable between a first position retracted from between the platen roller and the thermal print head and a second position intervening between the platen roller and the thermal print head and between the recording medium and the carrier medium for separating the recording medium and carrier medium from each other, and (f) means for coupling the guide member and the thermal print head together so that the guide member is moved to the first position in response to movement of the thermal print head to the operative position and is moved to the second position in response to movement of the thermal print head to the inoperative position.

BRIEF DESCRIPTION OF THE DRAWINGS

The advantages of a multi-color thermal transfer printing apparatus according to the present invention will be more clearly appreciated from the following description taken in conjunction with the accompanying drawings in which like reference numerals designate similar or corresponding units, members and elements and in which:

FIGS. 1A and 1B are fragmentary side elevation views each showing a thermal transfer mechanism forming part of a first preferred embodiment of a multi-color thermal transfer printing apparatus according to the present invention, the thermal transfer mechanism including a thermal print head which is shown in an operative position in FIG. 1A and in an inoperative position in FIG. 1B;

FIG. 2 is a fragmentary plan view showing a portion of a typical example of a multi-color ink film which may be used as an ink carrier medium in a multi-color thermal transfer printing apparatus according to the present invention;

DESCRIPTION OF THE PREFERRED EMBODIMENTS

Preferred embodiments of a multi-color thermal transfer printing apparatus according to the present invention will be hereinafter described with reference to the drawings FIGS. 1A and 1B to FIGS. 4A and 4B show embodiments of the present invention each characterized in that a recording medium on which a multi-colored image is to be printed is enabled to reliably stay on the platen roller and to accurately move back to a print-start position after the print head is spaced apart from the platen roller. Each of these embodiments of the present invention is further characterized in that the thermal print head is allowed to form a multi-colored image substantially throughout the entire area of the recording medium.

Figure 1A:
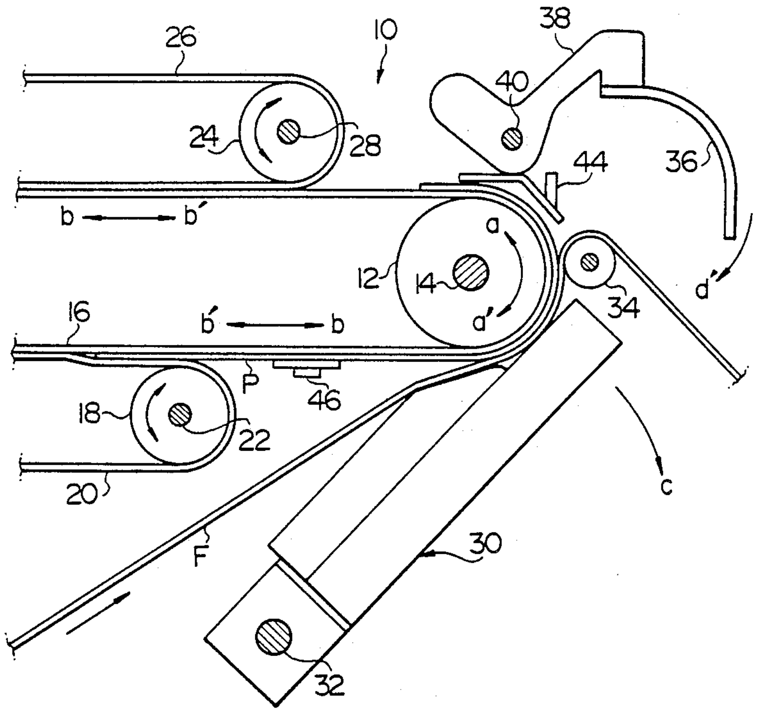

Referring first to FIGS. 1A and 1B, a first preferred embodiment of a multi-color thermal transfer printing apparatus according to the present invention comprises a thermal transfer mechanism 10 provided in a stationary housing structure (not shown). The thermal transfer mechanism 10 in turn comprises a cylindrical platen roller 12 rotatable with a roller shaft 14 which may be at its opposite ends journalled in or otherwise supported by the housing structure of the apparatus. An endless main sheet feeder belt 16 is horizontally passed between the platen roller 12 and an associated roller spaced apart in parallel from the platen roller 12, though not shown in the drawings Either the roller shaft 14 carrying the platen roller 12 or the associated roller is operatively coupled to suitable reversible drive means (not shown) adapted to drive the platen roller 12 for rotation in opposite directions indicated by arrows a and a' about the center axis of the roller shaft 14. With the platen roller 12 thus driven for rotation in the directions of arrows a and a', the main sheet feeder belt 16 is caused to travel in directions indicated arrows b and b', respectively.

Below the main sheet feeder belt 16 are disposed a first or lower belt drive roller 18 and an endless first or lower auxiliary sheet feeder belt 20. The drive roller 18 is rotatable with a drive shaft 22 having a center axis parallel with and fixed with respect to the center axis of the roller shaft 14 carrying the platen roller 12. The auxiliary sheet feeder belt 20 is passed between the drive roller 18 and an associated idler roller (not shown) spaced apart in parallel from the drive roller 18 and has an upper travelling path portion held in contact with a lower travelling path portion of the main sheet feeder belt 16 as shown.

Similarly, a second or upper belt drive roller 24 and an endless second or upper auxiliary sheet feeder belt 26 are provided on top of the main sheet feeder belt 16. The upper belt drive roller 24 is rotatable with a drive shaft 28 also having a center axis parallel with and fixed with respect to the center axis of the roller shaft 14 carrying the platen roller 12. The upper auxiliary sheet feeder belt 26 is passed between the drive roller 24 and an associated idler roller (not shown) spaced apart in parallel from the drive roller 24 and has a lower travelling path portion held in contact with an upper travelling path portion of the main sheet feeder belt 16 as shown.

Each of the drive shafts 22 and 28 carrying the lower and upper belt drive rollers 18 and 24, respectively, is operatively coupled to suitable reversible drive means (not shown) adapted to drive the roller 18 or 24 for rotation in opposite directions. The lower belt drive roller 18 being thus driven for rotation in either direction, the lower auxiliary sheet feeder belt 20 has its upper travelling path porion moved together with the lower travelling path portion of the main sheet feeder belt 16. With the upper belt drive roller driven for rotation in either direction, the upper auxiliary sheet feeder belt 26 has its lower travelling path porion moved together with the upper travelling path portion of the main sheet feeder belt 16. The drive means associated with each of the lower and upper belt drive rollers 18 and 24 is adapted to drive the roller 18 or 24 for rotation at a velocity proportional to the speed at which the platen roller 12 is to be driven for rotation by the associated drive means.

A recording medium on which an image may be printed in a printing apparatus according to the present invention typically consists of a sheet of paper having a predetermined length and as such will be hereinafter referred to as print sheet. Such a print sheet is stored in a suitable supply source having a stock of print sheets and is supplied to the thermal transfer mechanism 10 by suitable print-sheet feeding means though not shown in the drawings.

In the thermal transfer mechanism 10 illustrated in FIGS. 1A and 1B, a print sheet P supplied from such a supply source is received between the main and lower auxiliary sheet feeder belts 16 and 20 and is conveyed by the belts 16 and 20 to pass through a print zone round the peripheral surface of the platen roller 12. Past the print zone round the platen roller 12, the print sheet P is conveyed on the turning end portion of the main sheet feeder belt 16 on the peripheral surface of the platen roller 12 and is received between the main and upper auxiliary sheet feeder belts 16 and 26.

In the multi-color thermal transfer printing apparatus embodying the present invention, three single-colored components of a whole multi-color image may be printed on a print sheet P in three consecutive cycles of printing operation with use of a continuous length of multi-color ink film F. The multi-color ink film used as an ink carrier medium in the printing apparatus embodying the present invention has carried thereon a thin layer of thermally fusible image transfer toning materials or inks of different colors. The image transfer toning materials or inks carried on the ink film F are typically colored in yellow (Y), magenta (M) and cyan (C) and are applied in a succession of distinct and contiguous areas arranged to recur along the length of the ink film as indicated by $F_Y$, $F_M$ and $F_C$, respectively in FIG. 2. Each of these yellow-, magenta- and cyan-colored areas $F_Y$, $F_M$, $F_C$, $F_Y$, . . . of the ink film F has leading end trailing ends skewed to the longitudinal edges of the film F and has a length substantially equal to the predetermined length of the print sheet P which is herein assumed to be in use. The ink film F is driven to stepwise travel longitudinally by suitable ink-film feeding means from a supply reel toward a takeup reel (not shown). During operation of the apparatus, the ink film F is pressed against the print sheet P advancing through the print zone round the peripheral surface of the platen roller 12 with any one of the colored areas $F_Y$, $F_C$, $F_M$, . . . of the ink film F held in registry with the print sheet P.

The thermal transfer mechanism 10 illustrated in FIGS. 1A and 1B further comprises a thermal print head 30 by means of which the ink film F is to be pressed against the print sheet P during each cycle of printing operation. As is customary in the art, the thermal print head 30 comprises a multiplicity of heater elements (not shown) which are arranged in an array and which are to be selectively activated responsive to a set of image signals supplied from any image scanning or image data supply means A multi-colored image represented by the signals thus supplied to the print head 30 is formed on the print sheet P by the pixels of differently colored inks transferred from the ink film F to the surface of the recording medium in three consecutive cycles of printing operation.

The print head 30 forming part of the thermal transfer mechanism 10 in the printing apparatus embodying the present invention is rockable on a pivot shaft 32 having a center axis parallel with and fixed with respect to the center axis of the roller shaft 14. The print head 30 is thus pivotally movable about the center axis of the pivot shaft 32 in opposite directions indicated by arrows c and c' in FIGS. 1A and 1B, respectively. In the arrangement herein shown, the print head 30 is movable between an operative or first angular position close to the platen roller 12 as shown in FIG. 1A and an inoperative or second angular position spaced apart from to the platen roller 12 as shown in FIG. 1B.

During each cycle of printing operation, the main sheet feeder belt 16 is driven to travel in the direction of arrow b or b′ to convey the print sheet P to a predetermined printstart position with respect to the platen roller 12. In this instance, the print head 30 is driven to turn in the direction of arrow c′ to its first angular position close to the platen roller 12 as illustrated in FIG. 1A so that the ink film F engaged by the print head 30 has one of its colored areas pressed against the surface of the print sheet P advancing through the print zone round the peripheral surface of the platen roller 12. Single-colored pixels to form part of the whole multicolored image to be finally reproduced are formed on the surface of the print sheet P by transfer of an ink from the ink film F intervening between the print sheet P on the turning end portion of the main sheet feeder belt 16 and the array of the heater elements provided in the print head 30. Toward the end of the cycle of printing operation, the print head 30 is driven to turn in the direction of arrow c to its second angular position spaced apart from the platen roller 12 as illustrated in FIG. 1B so that the ink film F engaged by the print head 30 is spaced far apart from the platen roller 12.

After the single-colored component of the whole multi-colored image to be finally reproduced is thus printed on the print sheet P, the ink film F is driven to travel a predetermined distance on the print head 30 and is directed past a film stripper roller 34 toward the takeup reel (not shown). In the embodiment of the present invention illustrated in FIGS. 1A and 1B, this film stripper roller 34 is arranged to be movable with the print head 30 and forms part of the ink-film feeding means of a printing apparatus according to the present invention.

While the ink film F is driven to travel a predetermined distance from the initial position, the main sheet feeder belt 16 is also driven to travel in the direction of arrow b′ so that the print sheet P which has been forwardly moved past the print zone round the platen roller 12 is returned to the initial print-start position with respect to the platen roller 12. The ink film F having been endwise moved a predetermined distance, the fresh colored area subsequent to the colored area used for the immediately preceding cycle of printing operation now intervenes between the print head 30 and the print sheet P on the platen roller 12 thus returned to the initial print-start position with respect to the platen roller 12.

The thermal transfer mechanism 10 of the multi-color thermal transfer printing apparatus embodying the present invention further comprises a print-sheet guide member 36 supported by a bracket member 38 pivotally movable on a pivot shaft 40. The pivot shaft 40 has a center axis parallel with and fixed with respect to the center axis of the roller shaft 14. The print-sheet guide member 36 has a portion arcuately curved through about 90 degrees and is rockable on the pivot shaft 40. The guide member 36 is thus pivotally movable about the center axis of the pivot shaft 40 in opposite directions indicated by arrows d and d′ in FIGS. 1A and 1B, respectively.

In the arrangement herein shown, the guide member 36 is movable between an operative o first angular position close to the platen roller 12 as shown in FIG. 1B and an inoperative or second angular position spaced apart from the platen roller 12 as shown in FIG. 1A. When the guide member 36 is pivotally moved to the second angular position close to the platen roller 12 as shown in FIG. 1A, there is formed an arcuately curved print-sheet passageway 42 between a turning end portion of the main sheet feeder belt 16 and the arcuately curved portion of the guide member 36. The print-sheet passageway 42 contains the print zone round the platen roller 12 and thus allows a print sheet P to pass accurately through the print zone round the platen roller 12. The print-sheet guide member 36 is prevented from being turned beyond the second angular position by engagement with a stop member 44 projecting from a suitable bracket member which may be secured to the housing structure of the apparatus.

In conjunction with the print-sheet passageway 42 of a print sheet P toward the print zone round the platen roller 12 is located a print-sheet sensor 46 adapted to detect the presence or absence of a print sheet P being moved to the print zone. In the arrangement herein shown, such a print-sheet sensor 46 is located in the vicinity of the platen roller 12 and the lower travelling path portion of the main sheet feeder belt 16 as shown. The print-sheet sensor 46 thus arranged is operative to produce a signal of logic "1" level in the presence of a print sheet P advancing into the print-sheet passageway 42.

For the printing of a multi-color image on a single print sheet P, the platen roller 12 is first driven for rotation in the direction of arrow a so that the main sheet feeder belt 16 travels in the direction of arrow b. The lower belt drive roller 18 is driven for rotation in the direction in which the lower auxiliary sheet feeder belt 20 has its upper travelling path porion moved together with the lower travelling path portion of the main sheet feeder belt 16.

A print sheet P on which a multi-color image is to be printed is supplied from the supply source of print sheets and is received between the lower and lower travelling path portions of the main and lower auxiliary sheet feeder belts 16 and 20, respectively. The print sheet P is conveyed by the belts 16 and 20 to pass through the print zone round the peripheral surface of the platen roller 12. An ink film F is stretched from the supply reel to the takeup reel through the print head 30 which is initially held in the second angular position spaced apart from the platen roller 12 as shown in FIG. 1B. The print head 30 being held in its second angular position, the print-sheet guide member 36 is held in the first angular position close to the platen roller 12 and forms the arcuately curved print-sheet passageway 42 between the turning end portion of the main sheet feeder belt 16 and the arcuately curved portion of the guide member 36. The print sheet P admitted into the print-sheet passageway 42 extends through the print zone round the platen roller 12.

The presence of the print sheet P advancing toward the print zone round the is detected by the print sheet sensor 46 whereupon the thermal print head 30 is driven to turn to the first angular position close to the platen roller 12 as illustrated in FIG. 1A. The thermal print head 30 being thus driven to turn to its first angular position, the ink film F engaged by the print head 30 is pressed against the surface of the print sheet P advancing through the print zone round the platen roller 12. With the print head 30 turned to the first angular position, the print-sheet guide member 36 which has been held in the operative first angular position is turned about the pivot shaft 40 to the second angular position spaced apart from the platen roller 12 as indicated in FIG. 1A.

The print head 30 being now held in its first angular position, the ink film F extending along the thermal print head 30 has one of its colored areas $F_Y$, $F_C$, $F_M$, $F_Y$, . . . located in registry with the print sheet P extending through the print zone round the platen roller 12. For the sake of description, it will be herein assumed that it is one of the yellow-colored zones $F_Y$ which the ink film F currently has in registry with the print sheet P.

The heater elements of the thermal print head 30 are then selectively activated by image signals supplied from the image scanning or image data supply means. Yellow-colored pixels to form part of the whole multi-colored image to be finally reproduced are now formed o the surface of the print sheet P by transfer of ink from the yellow-colored area $F_Y$ of the ink film F intervening between the print sheet P and the turning end portion of the main sheet feeder belt 16 on the thermal print head 30.

Past the print zone round the platen roller 12, the print sheet P is conveyed on the turning end portion of the main sheet feeder belt 16 on the peripheral surface of the platen roller 12 and is received between the upper and lower travelling path portions of the main and upper auxiliary sheet feeder belts 16 and 26, respectively.

On termination of the first cycle of printing operation for the printing of the yellow-colored image component, the print sheet P having the yellow-colored image component printed thereon is thus received between the upper and lower travelling path portions of the main and upper auxiliary sheet feeder belts 16 and 26. The print head 30 is then driven to turn in the direction of arrow c to the second angular position spaced apart from the platen roller 12 as illustrated in FIG. 1B so that the ink film F engaged by the print head 30 is spaced far apart from the platen roller 12 by means of the film stripper roller 34 which is movable with the print head 30. In synchronism with the movement of the print head 30 to its second angular position, the print-sheet guide member 36 which has been held in its second angular position is driven to turn to the first angular position close to the platen roller 12 as shown in FIG. 1B and forms the print-sheet passageway 42 round the turning end portion of the main sheet feeder belt 16.

The platen roller 12 is now driven for rotation in the opposite direction indicated by arrow a' so that the main sheet feeder belt 16 travels in the direction of arrow b' The upper belt drive roller is driven for rotation in the direction in which the upper auxiliary sheet feeder belt 26 has its lower travelling path porion moved together with the upper travelling path portion of the main sheet feeder belt 16.

With the platen roller 12 driven for rotation in the direction of arrow a', the print sheet P is conveyed by the belts 16 and 20 back into the print-sheet passageway 42 defined by the guide member 36 until the print sheet P reaches a predetermined print-start position with respect to the print zone round the platen roller 12. On the other hand, the ink film F stretched between the supply and takeup reels is driven to stepwise travel a predetermined distance along the print head 30. The magenta-colored area $F_C$ subsequent to the yellow-colored area $F_Y$ which has been used for the first cycle of printing operation is now moved to a position to intervene between the print head 30 and the print sheet P on the platen roller 12.

The print-sheet guide member 36 is then driven to turn to the second angular position spaced apart from the platen roller 12 as illustrated in FIG. 1A. The guide member 36 being thus driven to turn to its second angular position, the print head 30 which has been held in the second angular position is turned about the pivot shaft 40 to the first angular position close to the platen roller 12 as indicated in FIG. 1A.

The print head 30 being now held in the first angular position for a second time, the ink film F extending along the thermal print head 30 has a magenta-colored area $F_M$ located in registry with the print sheet P extending through the print zone round the platen roller 12. The heater elements of the thermal print head 30 are then selectively activated by image signals further supplied from the image scanning or image data supply means. A magenta-colored component of the whole multi-colored image to be finally reproduced is printed on the print sheet P on which the yellow-colored component of the image has already been printed.

Subsequently to the second cycle of printing operation for the printing of the magenta-colored image component, steps similar to those followed for the execution of the second cycle of printing operation are executed to perform the third cycle of printing operation for the printing of the cyan-colored image component. At the end of the third cycle of printing operation, three single-colored components, viz., yellow-, magenta- and cyan-colored components of the whole multi-color image are printed on the print sheet P. The print sheet P having the multi-color image printed thereon is withdrawn from the thermal transfer mechanism 10 by means of the main and upper auxiliary sheet feeder belts 16 and 26 and is discharged from the apparatus by suitable print-sheet discharge means (not shown) also forming part of the printing apparatus embodying the present invention.

Figure 3A:
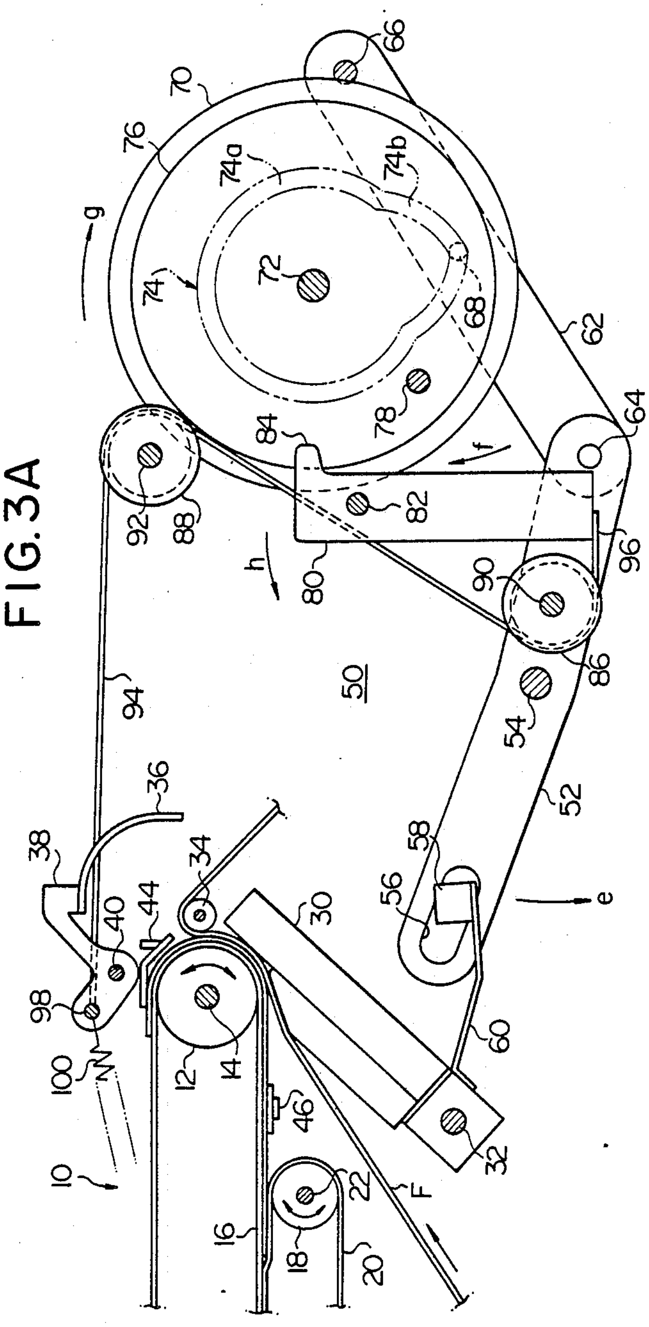
FIGS. 3A and 3B are fragmentary side elevation views each showing, in addition to the thermal transfer mechanism illustrated in FIGS. 1A and 1B, a synchronous actuator mechanism forming further part of the first preferred embodiment of a multi-color thermal transfer printing apparatus according to the present invention, the synchronous actuator mechanism shown in FIG. 3A being operative to hold the thermal transfer mechanism in a condition illustrated in FIG. 1A and the synchronous actuator mechanism shown in FIG. 3B being operative to hold the thermal transfer mechanism in a condition illustrated in FIG. 1B.
Figure 3B:
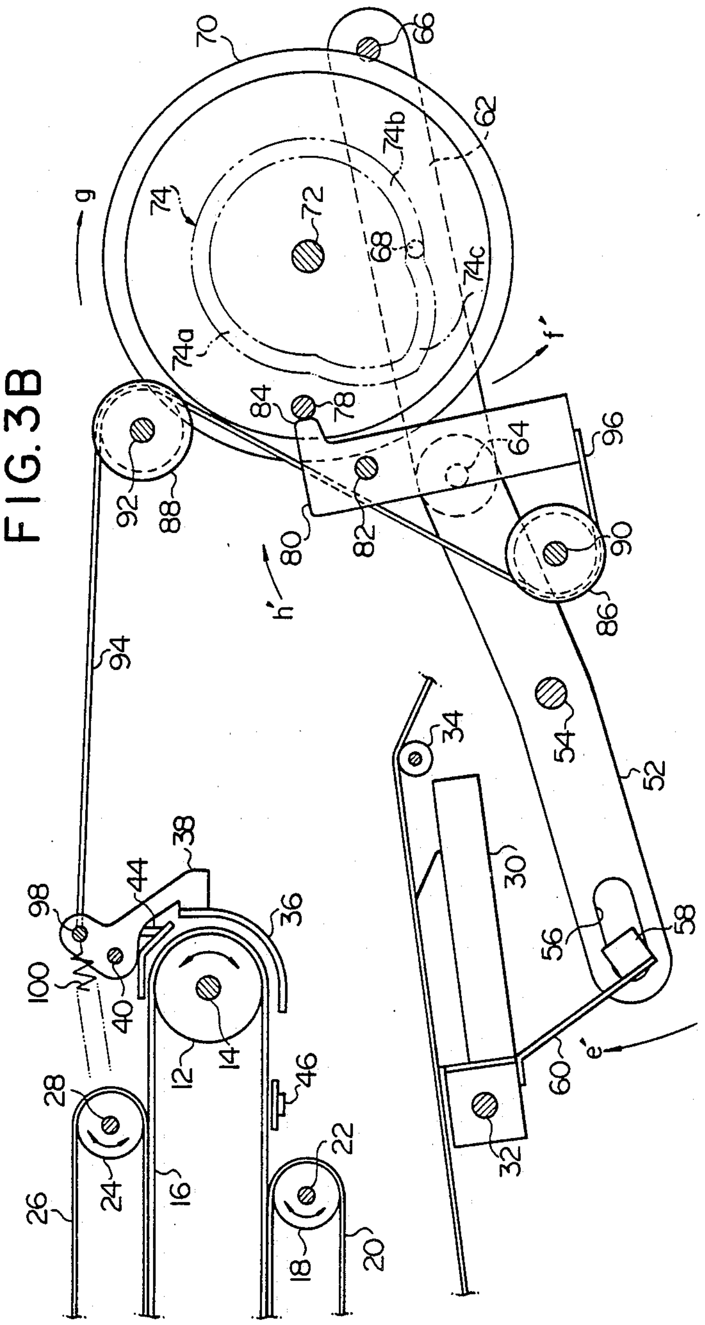

In the printing apparatus embodying the present invention, the thermal print head 30 and print-sheet guide member 36 of the thermal transfer mechanism 10 as hereinbefore described are driven to turn to their respective operative and inoperative positions or to their respective inoperative and operative positions concurrently by means of a synchronous actuator mechanism 50 illustrated in FIGS. 3A and 3B.

Referring to FIGS. 3A and 3B, the synchronous actuator mechanism 50 is also provided in the stationary housing structure of the apparatus and comprises a generally elongated rockable actuator lever 52 supported on a pivot shaft 54 having a center axis parallel with and fixed with respect to the center axis of the roller shaft 14 carrying the platen roller 12. The actuator lever 52 is pivotally movable about the center axis of the pivot shaft 54 in opposite directions of arrows e and e' between first and second angular positions indicated in FIGS. 3A and 3B, respectively. The actuator lever 52 has one arm portion extending away from the pivot shaft 54 toward the vicinity of the thermal print head 30 and having formed therein an elongated slot 56 longitudinally terminating in the vicinity of the end of the arm portion. Loosely received in the elongated slot 56 of the lever 52 is a slide member 58 which is slidable in and along the slot 56 toward and away from the pivot shaft 54. A leaf spring 60 is connected at one end to this slide member 58 and at the other to the print head 30. When the actuator lever 52 is turned in the direction of arrow e' to the first angular position indicated in FIG. 3A, the slide member 58 is moved toward the end of the slot 58 closer to the pivot shaft 54. In this instance, the leaf spring 60 connected to the slide member 58 acts to urge the print head 30 to turn about the pivot shaft 32 in the direction of arrow c' (FIG. 1B) toward its operative or first angular position with respect to the platen roller 12 as shown in FIGS. 1A and 3A. On the other hand, when the actuator lever 52 is turned in the direction of arrow e to the second angular position indicated in FIG. 3B, the slide member 58 is moved toward the end of the slot 58 remoter from the pivot shaft 54. Under this condition, the leaf spring 60 acts to urge the print head 30 to turn about the pivot shaft 32 in the direction of arrow c (FIG. 1A) toward its inoperative or second angular position with respect to the platen roller 12 as indicated in Figs 1B and 3B.

The actuator lever 52 has another arm portion extending in the opposite direction away from the pivot shaft 54. This arm portion of the actuator lever 52 is in the vicinity of its leading end pivotally coupled to an elongated link member 62 by means of a pivot pin 64 which is common to the lever 52 and link member 62 and which is parallel with the pivot shaft 54. The link member 64 in turn is rockable on a pivot shaft 66 having a center axis parallel with and fixed with respect to the center axis of the pivot shaft 54 of the actuator lever 52. The link member 64 is thus pivotally movable about the center axis of the pivot shaft 66 in opposite directions indicated by arrows f and f' in FIGS. 3A and 3B, respectively.

A cam follower pin 68 projects from an intermediate portion of the link member 62 in a direction parallel with the pivot shaft 66. In conjunction with this cam follower pin 68 is provided a circular cam member 70 rotatable with a drive shaft 72 having a center axis parallel with and fixed with respect to the center axes of the pivot shafts 54 and 66 for the actuator lever 52 and link member 62, respectively. The drive shaft 72 thus carrying the cam member 70 is operatively connected to suitable drive means (not shown) and is to be driven for rotation in the direction of arrow g at a predetermined velocity under the control of a signal produced from the print-sheet sensor 46 responsive to a print sheet P advancing into the print-sheet passageway 42 in the thermal transfer mechanism 10.

The circular cam member 70 has formed in one of its face a closed loop of cam groove 74 having a generally semicircular portion **74*a* and a protuberant lobe portion 74*b* as indicated by phantom lines in FIGS. 3A and 3B. The semicircular portion 74*a* extends about the center axis of the shaft 72 through a central angle of more than 180 degrees as shown. The protuberant lobe portion 74*b* of the cam groove 74 protrudes radially outwardly from the opposite ends of the semicircular portion 74*a* and has a vertex 74*c* (FIG. 3B) centrally located in the lobe portion 74*b* in the vicinity of the outer peripheral edge of the cam member 70**.

The cam follower pin 68 on the link member 62 projects into the cam groove 74 thus formed in the circular cam member 70. The cam follower pin 68 is movable in and along the semicircular portion **74*a* or the protuberant lobe portion 74*b* of the cam groove 74 as the cam member 70 is turned in the direction of arrow g about the center axis of the drive shaft 72**.

As the cam member 70 is thus turned about the center axis of the drive shaft 72, the cam member 70 will reach a rotational position having the cam follower pin 68 located at the vertex **74*c* of the protuberant lobe portion 74*b* of the cam groove 74. In this instance, the link member 62 is held in a first angular position close to the outer peripheral edge of the cam member 70 as indicated in FIG. 3A. As the cam member 70 is further turned from such a rotational position, the cam follower pin 68 is received in the protuburent lobe portion 74*b* of the cam groove 74. The link member 62 is now caused to turn radially inwardly of the cam member 70, viz., in the direction of arrow f about the center axis of the pivot shaft 66 until the cam follower pin 68 enters the semicircular portion 74*a* of the cam groove 74**.

As the cam member 70 is further turned in the direction of arrow g and assumes a rotational position having the cam follower pin 68 located in the semicircular portion **74*a* of the cam groove 74, the link member 62 is fixedly held in a second angular position with respect to the cam member 70 as indicated in FIG. 3B. The cam follower pin 68 on the link member 62 will be then allowed out of the semicircular portion 74*a* of the cam groove 74 and enter the protuburent lobe portion 74*b* of the groove 74 for a second time. The link member 62 is now caused to turn toward the outer peripheral edge of the cam member 70, viz., in the direction of arrow f' about the center axis of the pivot shaft 66. When the ca member 70 reaches the rotational position having the cam follower pin 68 located at the vertex 74*c* of the protuberant lobe portion 74*b* of the cam groove 74, the link member 62 restores the first angular position close to the outer peripheral edge of the cam member 70** as indicated in FIG. 3A.

Responsive to the rotation of the cam member 70 about the center axis of the drive shaft 72, the link member 62 is in these manners caused to rock about the pivot shaft 66 between the first angular position remote from the drive shaft 72 of the cam member 70 as shown in FIG. 3A and the second angular position close to the drive shaft 72 of the cam member 70 as shown in FIG. 3B. As will be described in more detail, the rocking motions of the link member 62 between these first and second angular positions are translated into rocking motions of the actuator lever 52 between the first and second angular positions, respectively, of the lever 52 about the center axis of the pivot shaft 54.

The drive shaft 72 of the cam member 70 arranged as above described is operatively connected to suitable drive means responsive to an appropriate control signal supplied from a control circuit (not shown) further included in the apparatus embodying the present invention. The control signal is produced on the basis of the signal output from the print-sheet sensor 46 responsive to a print sheet P advancing into the print-sheet passageway 42 in the thermal transfer mechanism 10 described with reference to FIGS. 1A and 1B.

As the link member 62 is caused to turn between the first and second angular positions about the center axis of the pivot shaft 66, the actuator lever 52 to which the link member 62 is pivotally connected is caused to turn about the center axis of the pivot shaft 54 between the first angular position indicated in FIG. 3A and the second angular position indicated in FIG. 3B. The rocking motions of the actuator lever 52 between its first and second angular positions in turn cause rocking motions of the print head 30 between the operative and inoperative or first and second angular positions thereof by the action of the leaf spring 60.

To the face of the cam member 70 opposite to the cam groove 74 is securely attached a circular disc member 76 which is disposed in concentric relationship to the cam member 70 and which is thus rotatable with the drive shaft 72 for the cam member 70. An engagement pin 78 projects from this disc member 76 in parallel with the drive shaft 72 and is located at a predetermined central angle to the vertex 74c of the protuberant lobe portion 74b of the cam groove 74 about the center axis of the drive shaft 72.

The engagement pin 78 is engageable with an actuator plate 80 which is pivotally movable on a pivot shaft 82 having a center axis parallel with and fixed with respect to the center axis of the drive shaft 72 for the cam member 72. The actuator plate 80 has a lug portion 84 projecting from one end of the plate 80 for engagement with the engagement pin 78 on the disc member 76. The cam follower pin 68, engagement pin 78 and actuator plate 80 are arranged so that, when the cam follower pin 68 is located at the vertex 74c of the protuberant lobe portion 74b of the cam groove 74, the engagement pin 78 is spaced apart from and accordingly not engageable with the lug portion 84 of the actuator plate 80 as will be seen from FIG. 3A.

The actuator plate 80 is pivotally movable about the center axis of the pivot shaft 82 in opposite directions of arrows h and h' between first and second angular positions indicated in FIGS. 3A and 3B. The actuator plate 80, when turned to the first angular position indicated in FIG. 3A, has its lug portion 84 located in the circular path of movement of the engagement pin 78. As the cam member 70 is turned in the direction of arrow g from the first rotational position about the center axis of the drive shaft 72, the engagement pin 78 on the disc member 76 is brought into pressing engagement with the lug portion 84 of the actuator plate 80 and urges the lug portion 84 to move with the engagement pin 78. This causes the actuator plate 80 to turn in the direction of arrow h about the center axis of the pivot shaft 82 and reach the second angular position allowing the lug portion 84 to ride on the engagement pin 78 as shown in FIG. 3B. As the cam member 70 is further turned in the direction of arrow g about the center axis of the drive shaft 72, the engagement pin 78 is released from the lug portion 84 of the actuator plate 80 and allows the actuator plate 80 to turn backwardly to the first angular position illustrated in FIG. 3A.

Further provided is motion transmitting means by which the rocking motions of the actuator plate 80 thus rockable between the first and second angular positions thereof are to be transmitted to the print-sheet guide member 46. In the arrangement shown in FIGS. 3A and 3B, such motion transmitting means comprises circumferentially grooved first and second pulleys 86 and 88 rotatable on shafts 90 and 92, respectively. Each of the shafts 90 and 92 thus carrying the pulleys 86 and 88 is parallel with the pivot shaft 82 for the actuator plate 80 and has a center axis fixed with respect to the center axis of the pivot shaft 82. The first pulley 86 is located in the neighborhood of the end of the actuator plate 80 opposite to the lug portion 84 and the second pulley 88 located appropriately intermediate between the first pulley 86 and the print-sheet guide member 36 as shown.

The motion transmitting means of the apparatus embodying the present invention further comprises a continuous length of flexible line implemented by a pliable wire 94 which is anchored at one end to the end portion of the actuator plate 80 opposite to the lug portion 84 as at 96. The wire 94 is anchored at the other end to an anchor pin 98 secured to the bracket member 38 to which the print-sheet guide member 36 is attached. The wire 94 thus extending between the actuator plate 80 and the bracket member 38 is stretched straight between the actuator plate 80 and the first pulley 86, passed in a staggering relationship between the first and second pulleys 86 and 88, and is stretched straight between the second pulley 88 and the bracket member 38 carrying the print-sheet guide member 36. The print-sheet guide member 36 is urged to turn toward the second angular position spaced apart from the platen roller 12 by suitable biasing means. In the arrangement herein shown, such biasing means is shown comprising a return spring 100 implemented by a helical tension spring which is anchored at one end to the anchor pin 98 on the bracket member 38. The return spring 100 is anchored at the other end to a suitable anchor element (not shown) which may be secured to the housing structure of the apparatus. The force of the return spring 100 thus urging the print-sheet guide member 36 to turn toward its second angular position is transmitted through the wire 94 to the actuator plate 80 and urges the actuator plate 82 to turn in the direction of arrow h' toward its first angular position indicated in FIG. 3A.

Description will be hereinafter made in regard to the general manner of operation of the synchronous actuator mechanism 50 constructed and arranged as hereinbefore described.

The drive shaft 72 of the cam member 70 is driven for rotation in the direction of arrow at a predetermined velocity under the control of a signal produced from the print-sheet sensor 46 responsive to a print sheet P advancing into the print-sheet passageway 42 in the thermal transfer mechanism 10 described with reference to FIGS. 1A and 1B.

As the cam member 70 is thus driven for rotation in the direction of arrow g, the cam member 70 will reach a rotational position having the cam follower pin 68 located at the vertex 74c of the protuberant lobe portion 74b of the cam groove 74. In this instance, the link member 62 is held in the first angular position close to the outer peripheral edge of the cam member 70 and accordingly the actuator lever 52 is held in the first angular position indicated in FIG. 3A. The actuator lever 52 being held in its first angular position, the slide member 58 on the actuator lever 52 is located in the vicinity of the end of the slot 58 closer to the pivot shaft 54. Thus, the leaf spring 60 connected to the slide member 58 acts to urge the thermal print head 30 to turn about the pivot shaft 32 in the direction of arrow c' (FIG. 1B) toward its operative or first angular position close to the platen roller 12 as shown in FIGS. 1A and 3A. With the print head 30 held in its first angular position, the ink film F engaged by the print head 30 is pressed against the surface of the print sheet P advancing through the print zone round the platen roller 12 as previously described with reference to FIG. 1A. One single-colored component of the whole multi-color image to be reproduced on the print sheet P is thus thermally transferred to the print sheet P from, for example, a yellow-colored area $F_Y$ (FIG. 2) of the ff F. The print sheet P having the yellow-colored image component printed thereon is received between the main and upper auxiliary sheet feeder belts 16 and 26.

The cam follower pin 68 on the link member 62 being located at the vertex 74c of the protuberant lobe portion 74b of the cam groove 74, the actuator plate 80 has its lug portion 84 disengaged from the engagement pin 78 on the disc member 76 and is therefore maintained in its first angular position indicated in FIG. 3A by the force of the return spring 100 transmitted to the actuator plate 80 through the wire 94. With the actuator plate 80 held in its first angular position, the print-sheet guide member 36 connected to the actuator plate 80 by means of the bracket member 38 and wire 94 is maintained in its inoperative, second angular position spaced apart from the platen roller 12 by the force of the return spring 100.

As the cam member 70 is driven for rotation in the direction of arrow g, the cam follower pin 68 moves in and along the protuberent lobe portion 74*b* of the cam groove 74 away from the vertex 74*c* of the lobe portion 74*b*. The link member 62 is accordingly caused to turn radially inwardly of the cam member 70, viz., in the direction of arrow f about the center axis of the pivot shaft 66 until the cam follower pin 68 enters the semicircular portion 74*a* of the cam groove 74. The link member 62 being thus caused to turn from the first angular position toward the center axis of the drive shaft 72, the actuator lever 52 is caused to turn in the direction of arrow e toward the second angular position indicated in FIG. 3B. When the actuator lever 52 reaches the second angular position, the slide member 58 on the lockable lever 52 is located in the vicinity of the end of the slot 58 remoter from the pivot shaft 54. The leaf spring 60 is now effective to urge the thermal print head 30 to turn in the direction of arrow c (FIG. 1A) toward its inoperative or second angular position spaced apart from the platen roller 12 as indicated in FIGS. 1B and 3B.

At a predetermined timing after the cam member 70 is turned in the direction of arrow g from its first rotational position, the engagement pin 78 on the disc member 76 is brought into pressing engagement with the lug portion 84 of the actuator plate 80 and urges the lug portion 84 to move with the engagement pin 78. This causes the actuator plate 80 to turn in the direction of arrow h about the center axis of the pivot shaft 82 and reach the second angular position allowing the lug portion 84 to ride on the engagement pin 78 as shown in FIG. 3B. With the actuator plate 80 thus turned to its second angular position, the print-sheet guide member 36 connected to the actuator plate 80 by means of the bracket member 38 and wire 94 is forced to turn from the second angular position to the first angular position close to the platen roller 12 against the force of the return spring 100. Between the turning end portion of the main sheet feeder belt 16 and the arcuately curved portion of the guide member 36 is now formed the arcuately curved print-sheet passageway 42 so that the print sheet P received between the main and upper auxiliary sheet feeder belts 16 and 26 is admitted backwardly into the print-sheet passageway 42 and is thus allowed to extend through the print zone round the platen roller 12 with the platen roller 12 driven for rotation in the direction of arrow a'. Thus, the engagement pin 78 is operative to transmit the movement of the cam member 70 away from the first rotational position thereof at a predetermined timing after the cam member 70 has assumed its first rotational position. The timing at which the engagement pin 78 is enabled to transmit the movement of the cam member 70 away from its first rotational position is dictated by the central angle through which the engagement pin 78 is spaced apart from the vertex 74*c* in the cam groove 74 about the axis of rotation of the cam member 70.

As the cam member 70 is further turned in the direction of arrow g, the engagement pin 78 is released from the lug portion 84 of the actuator plate 80 and allows the actuator plate 80 to turn from the second angular position backwardly to the first angular position illustrated in FIG. 3A. The cam follower pin 68 on the cam member 70 is now located in the semicircular portion 74*a* of the cam groove 74 so that the link member 62 is fixedly held in the second angular position close to the center axis of the drive shaft 72 as indicated in FIG. 3B. The link member 62 being maintained in the second angular position, the actuator lever 52 is also held in its second angular position and, as a consequence, the thermal print head 30 is maintained in its inoperative, second angular position spaced apart from the platen roller 12.

The cam follower pin 68 on the link member 62 will be then allowed out of the semicircular portion 74*a* of the cam groove 74 and enter the protuberent lobe portion 74*b* of the groove 74 for a second time. The link member 62 is now caused to turn toward the outer peripheral edge of the cam member 70, viz., in the direction of arrow f'. When the cam member 70 reaches the rotational position having the cam follower pin 68 located at the vertex 74*c* in the protuberant lobe portion 74*b* of the cam groove 74, the link member 62 restores the first angular position close to the outer peripheral edge of the cam member 70 as indicated in FIG. 3A. The actuator lever 52 also resumes the first angular position so that the leaf spring 60 acts to urge the thermal print head 30 to turn toward its operative or first angular position close to the platen roller 12 so that the ink film F engaged by the print head 30 is pressed against the surface of the print sheet P advancing through the print zone round the platen roller 12. Another single-colored component of the whole multicolor image to be reproduced on the print sheet P is thus thermally transferred to the print sheet P from, for example, a magenta-colored area $F_M$ (FIG. 2) of the ff F.

On the other hand, the actuator plate 80 has its lug portion 84 disengaged from the engagement pin 78 on the disc member 76 and is maintained in its first angular position so that the print-sheet guide member 36 is maintained in its inoperative, second angular position spaced apart from the platen roller 12 by the force of the return spring 100.

Figure 4A:
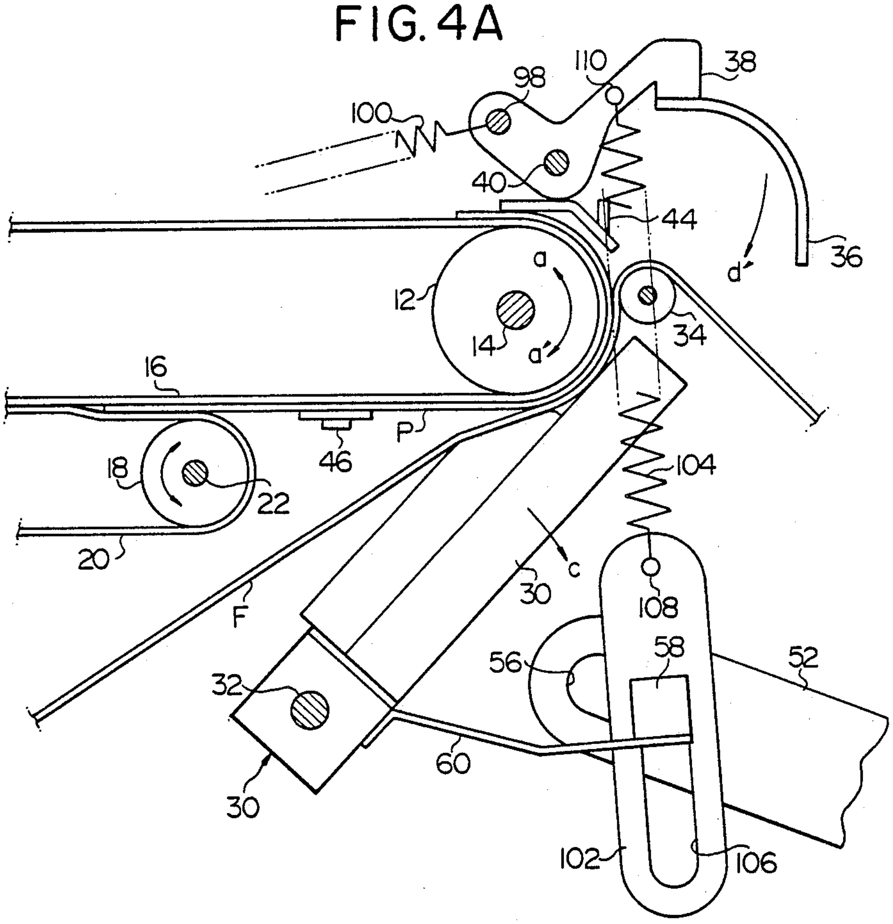
FIGS. 4A and 4B are fragmentary side elevation views each showing part of a second preferred embodiment of a multi-color thermal transfer printing apparatus according to the present invention.
Figure 4B:
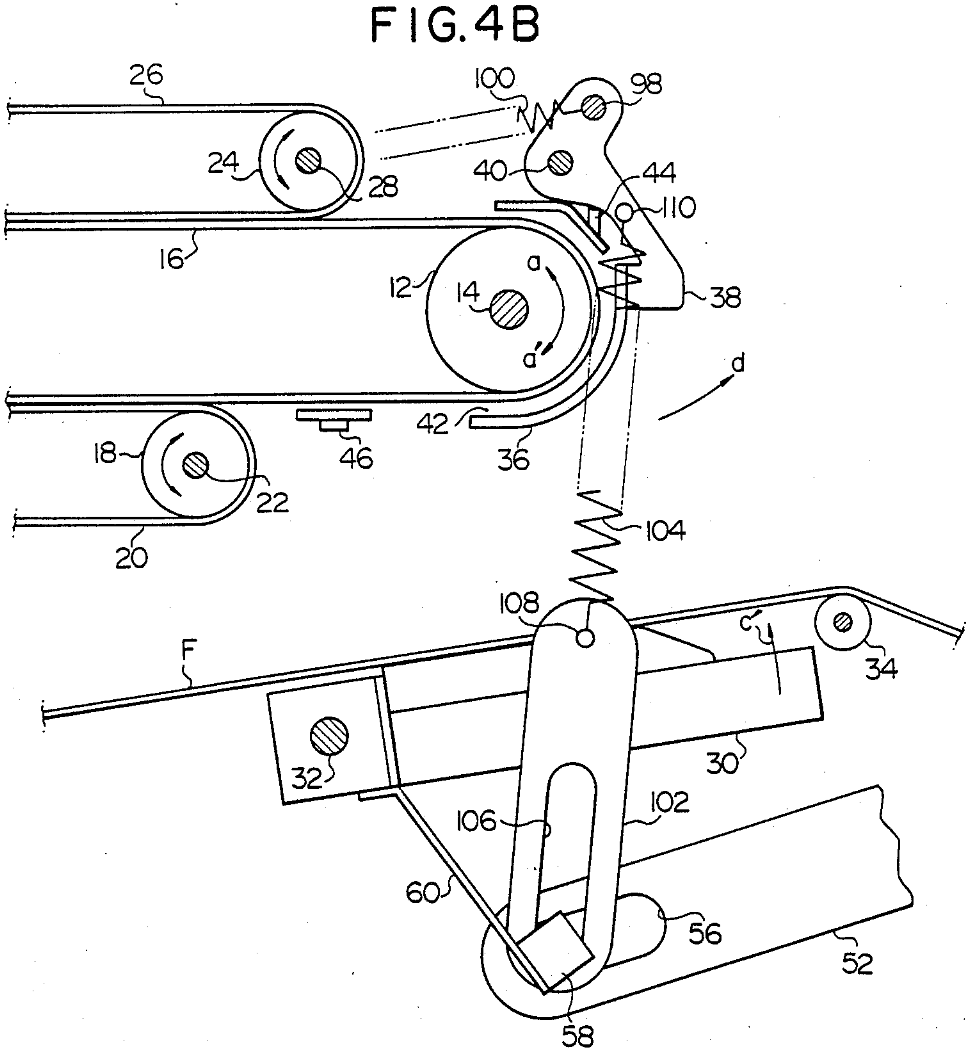

FIGS. 4A and 4B show part of a second preferred embodiment of a multi-color thermal transfer printing apparatus according to the present invention. The embodiment of the present invention herein shown is largely similar to the first preferred embodiment of a printing apparatus according to the present invention and is characterized by modified form of motion transmitting means provided for transmitting the rocking motions of the actuator plate 80 to the print-sheet guide member 46.

In the modified form of motion transmitting means of the apparatus herein shown, the combination of the cam member 76, engagement pin 78, actuator plate 80, pulleys 86 and 88 and wire 94 forming part of the motion transmitting means of the thermal transfer mechanism 50 described with reference to FIGS. 3A and 3B is substituted by the combination of an actuating member implemented by an elongated timing control plate 102 and a counteracting spring 104. The combination of the timing control plate 102 and counteracting spring 104 is provided in combination with the actuator lever 52, slide member 58, leaf spring 60, link member 62 and cam member 70 arranged as illustrated in FIGS. 3A and 3B. The modified motion transmitting means herein shown is provided to intervene in effect between the print-sheet guide member 36 and the actuator lever 52 through the slide member 58.

The timing control plate 102 which forms part of the modified motion transmitting means has an elongated slot 106 longitudinally terminating in the vicinity of one end of the timing control plate 102. In the slot 106 in the timing control plate 102 is loosely received the slide member 58 connected by the leaf spring 60 to the thermal print head 30. The slide member 58 in the thermal transfer mechanism shown in FIGS. 4A and 4B thus engages not only the actuator lever 52 through the slot 56 but also the timing control plate 102 through the slot 106. The counteracting spring 104 is anchored at one end to a spring retainer pin 108 located on the end portion of the timing control plate 102 opposite to the slot 106 and at the other to a spring retainer pin 110 located on the bracket member 38 carrying the print-sheet guide member 36 as shown. The print-sheet guide member 36 is thus urged to turn about the center axis of the pivot shaft 40 in the direction of arrow d' toward its operative or first angular position by means of the return spring 100 and in the direction of arrow d toward its inoperative or second angular position by means of the counteracting spring 104.

As the actuator lever 52 is turned between its first and second angular positions responsive to rocking motions of the link member 62 (FIGS. 3A and 3B), the arm portion of the actuator lever 52 engaged by the timing control plate 102 through the slide member 58 is moved toward and away from the pivot shaft 40 for the print-sheet guide member 36.

Thus, when the actuator lever 54 is turned to its first angular position, the slide member 58 on the actuator lever 52 is moved toward the end of the slot 58 closer to the pivot shaft 54 for the lever 54. The leaf spring 60 connected to the slide member 58 acts to urge the thermal print head 30 to turn about the pivot shaft 32 in the direction of arrow c' (FIG. 4B) toward its operative or first angular position close to the platen roller 12 as shown in FIG. 4A. With the print head 30 held in its first angular position, the ink film F engaged by the print head 30 is pressed against the surface of the print sheet P advancing through the print zone round the platen roller 12 as previously described with reference to FIG. 1A.

The actuator lever 52 being turned to the first angular position, the arm portion of the actuator lever 52 engaged by the timing control plate 102 is moved toward the pivot shaft 40 for the print-sheet guide member 36. The timing control plate 102 engaging the actuator lever 54 through the slide member 58 is accordingly allowed to longitudinally move toward the bracket member 38 carrying the print-sheet guide member 36. This gives rise to a significant decrease in the tension in the counteracting spring 104. The return spring 100 acting on the print-sheet guide member 36 now overpowers the counteracting spring 104 with the result that the print-sheet guide member 38 is caused to turn in the direction of arrow d to its second angular position about the center axis of the pivot shaft 40 as illustrated in FIG. 4A.

On the other hand, when the actuator lever 52 is turned to its second angular position, the slide member 58 on the actuator lever 52 is moved toward the end of the slot 58 remoter from the pivot shaft 54 for the lever 54. The leaf spring 60 connected to the slide member 58 now acts to urge the thermal print head 30 to turn about the pivot shaft 32 in the direction of arrow c (FIG. 4A) toward its inoperative or second angular position spaced apart from the platen roller 12 as shown in FIG. 4B. The actuator lever 54 being turned to the second angular position, the arm portion of the actuator lever 52 engaged by the timing control plate 102 is moved away from the pivot shaft 40 for the print-sheet guide member 36. The timing control plate 102 engaging the actuator lever 54 is accordingly forced to longitudinally move way from the bracket member 38 carrying the print-sheet guide member 36. This gives rise to an increase in the tension in the counteracting spring 104 and, as a consequence, the counteracting spring 104 now overpowers the return spring 100. The print-sheet guide member 38 is accordingly caused to turn in the direction of arrow d' to its first angular position about the center axis of the pivot shaft 40 as illustrated in FIG. 4B. The arcuately curved print-sheet passageway 42 is now formed between the main sheet feeder belt 16 and the print-sheet guide member 36 so that the print sheet P received between the main and upper auxiliary sheet feeder belts 16 and 26 is admitted backwardly into the print-sheet passageway 42.

As the actuator lever 52 is turned between its first and second angular positions, the slide member 58 engaging both the actuator lever 54 and the timing control plate 102 is moved between the opposite, inner and outer ends of the elongated slot 106 in the timing control plate 102. Accordingly, the print-sheet guide member 36 is caused to turn from the second angular position t the first angular position thereof with a certain amount of time lag after the thermal print head 30 is turned from the first angular position to the second angular position thereof. Similarly, the guide member 36 is caused to turn from the first angular position to the second angular position thereof with a certain amount of time lag after the thermal print head 30 is turned from the second angular position to the first angular position thereof.

Thus, the combination of the slot 106 in the timing control plate 102 and the slide member 58 movable in the slot 106 provides lost-motion cam means enabling the print-sheet guide member 36 to turn to its inoperative or operative position with a certain amount of time lag after the print head 30 is turned to the operative or inoperative position, respectively, thereof. In this instance, the timing control plate 102 is movable between a first position having the counteracting spring 104 overpowered by the return spring 100 for allowing the guide member 36 to move away from the operative position thereof and a second position having the return spring 100 overpowered by the counteracting spring 104 for allowing the guide member 36 to move to the operative position thereof. The lost-motion cam means implemented by the combination of the slot 106 and the slide member 58 is operative to produce a lost motion in the movement of the timing control plate 102 between the first and second positions thereof.

Due to the lost motion thus produced in the movement of the timing control plate 102, the print-sheet guide member 36 is enabled to turn to its inoperative or operative position with a certain amount of time lag after the print head 30 is turned to the operative or inoperative position, respectively, thereof. Such time differential movements of the print head 30 and print-sheet guide member 36 is intended for preventing an occurrence of interference therebetween during movement of the print head 30 and guide member 36. The amount of time lag between such time differential movements of the print head 30 and guide member 36 is regulated through proper selection of the length of the slot 106 in the timing control plate 102.

As will have been understood from the foregoing description, each of the first and second preferred embodiments of the present invention each characterized in that a print sheet P on which a multi-colored image is to be printed is enabled to reliably stay on the platen roller 12 under the guidance of the print-sheet guide member 36 positioned close to the platen roller 12 when the thermal print head 30 is spaced apart from the platen roller 12. After the thermal print head 30 is spaced apart from the platen roller 12, the print sheet P on which a single-colored component of the multi-color image has been printed is thus enabled to accurately move back to the initial print-start position without aid of any extra pressing roller. Each of the first and second preferred embodiments of the present invention is further characterized in that, in the absence of any pressing roller located on the print sheet P, the thermal print head 20 is allowed to form a multi-colored image substantially throughout the entire area of the print sheet P.

Figure 5:
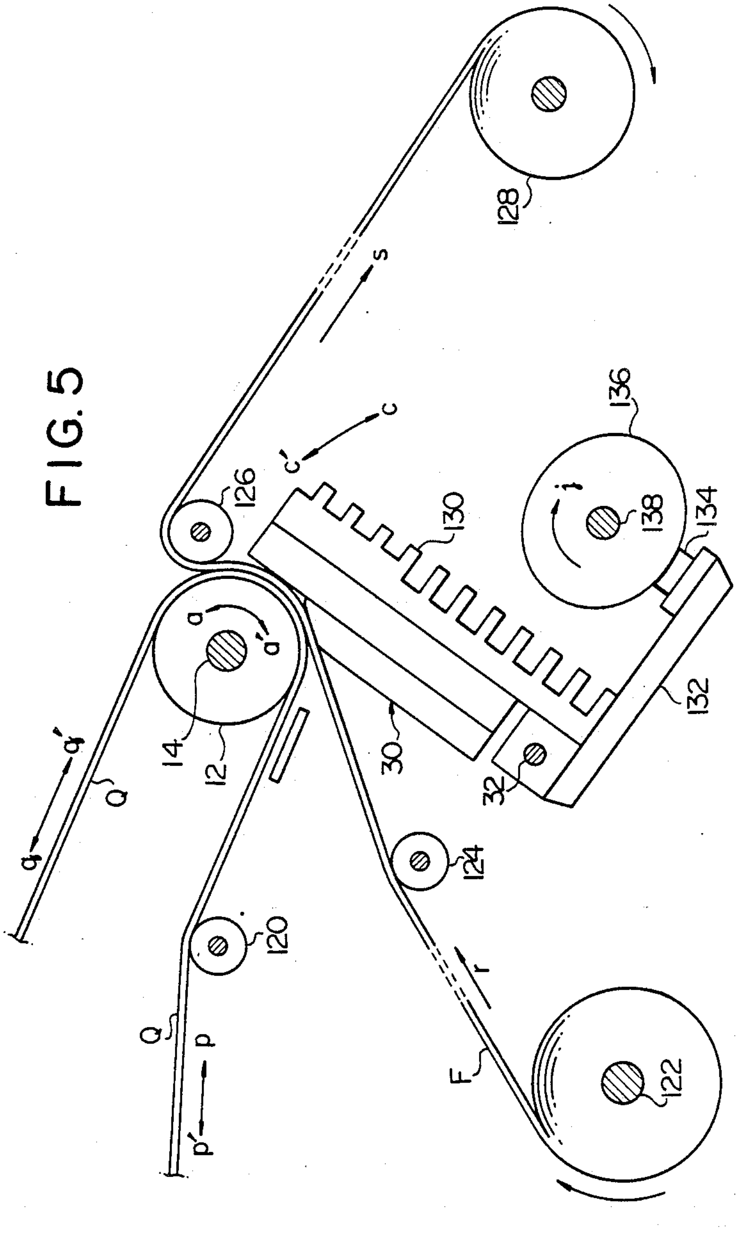
FIG. 5 is a fragmentary side elevation view showing a third preferred embodiment of a multi-color thermal transfer printing apparatus according to the present invention.

FIG. 5 shows a third preferred embodiment of the present invention characterized in that the ink film allowed to remain on a recording medium temporarily after the ink film is released from the print head is assuredly isolated from the ink film and is prevented from being accidentally brought into contact with the ink film while the recording medium is being moved back to the initial print-start position with respect to the platen roller.

Used as a recording medium in the printing apparatus illustrated in FIG. 5 is a continuous length of print sheet Q which is typically in the form of a fanfold sheet having a series of perforations along each longitudinal edge of the sheet. Though not shown in the drawings, such a print sheet Q is stored in the form of a roll on a print-sheet supply reel and is endiwse fed as indicated by arrow p by suitable print-sheet feeding means such as typically a tractor feed mechanism (not shown). The print sheet Q is driven to stepwise travel by way of a guide roller 120 to the platen roller 12 and is thereafter turned back round the platen roller 12 to advance toward a suitable takeup reel (not shown) as indicated by arrow q. The platen roller 12 is carried on a roller shaft 14 having a center axis fixed in the housing structure (not shown) of the apparatus. The roller shaft 14 thus carrying the platen roller 12 is coupled to suitable reversible drive means (not shown) adapted to drive the platen roller 12 for rotation in opposite directions indicated by arrows a and a' about the center axis of the roller shaft 14.

In the multi-color thermal transfer printing apparatus embodying the present invention, three single-colored components of a multi-color image may also be printed on the print sheet Q in three consecutive cycles of printing operation with use of a continuous length of multi-color ink film F. The multi-color ink film F per se is similar to that illustrated in FIG. 2 and, thus, having a succession of recurrent yellow-, magenta- and cyan-colored areas $F_Y$, $F_M$, $F_C$, $F_Y$, . . . each having a predetermined length. The ink film F is stored in the form of a roll on a supply reel 122 and is driven by suitable ink-film feeding means (not shown) to stepwise travel toward the platen roller 12 as indicated by arrow r by way of a guide roller 124 located intermediate between the supply reel 122 and the platen roller 12. The ink film F is brought into contact with the print sheet Q on the peripheral surface of the platen roller 12 and is separated from the print sheet Q by means of a film stripper roller 126 located in parallel with the platen roller 12. Past the film stripper roller 126, the ink film F travels toward a takeup reel 128 as indicated by arrow s and is wound into roll form on the reel 128. The film stripper roller 126 in the embodiment herein shown has an axis of rotation parallel with and fixed with respect to the center axis of the roller shaft 14 carrying the platen roller 12.

Figure 6A:
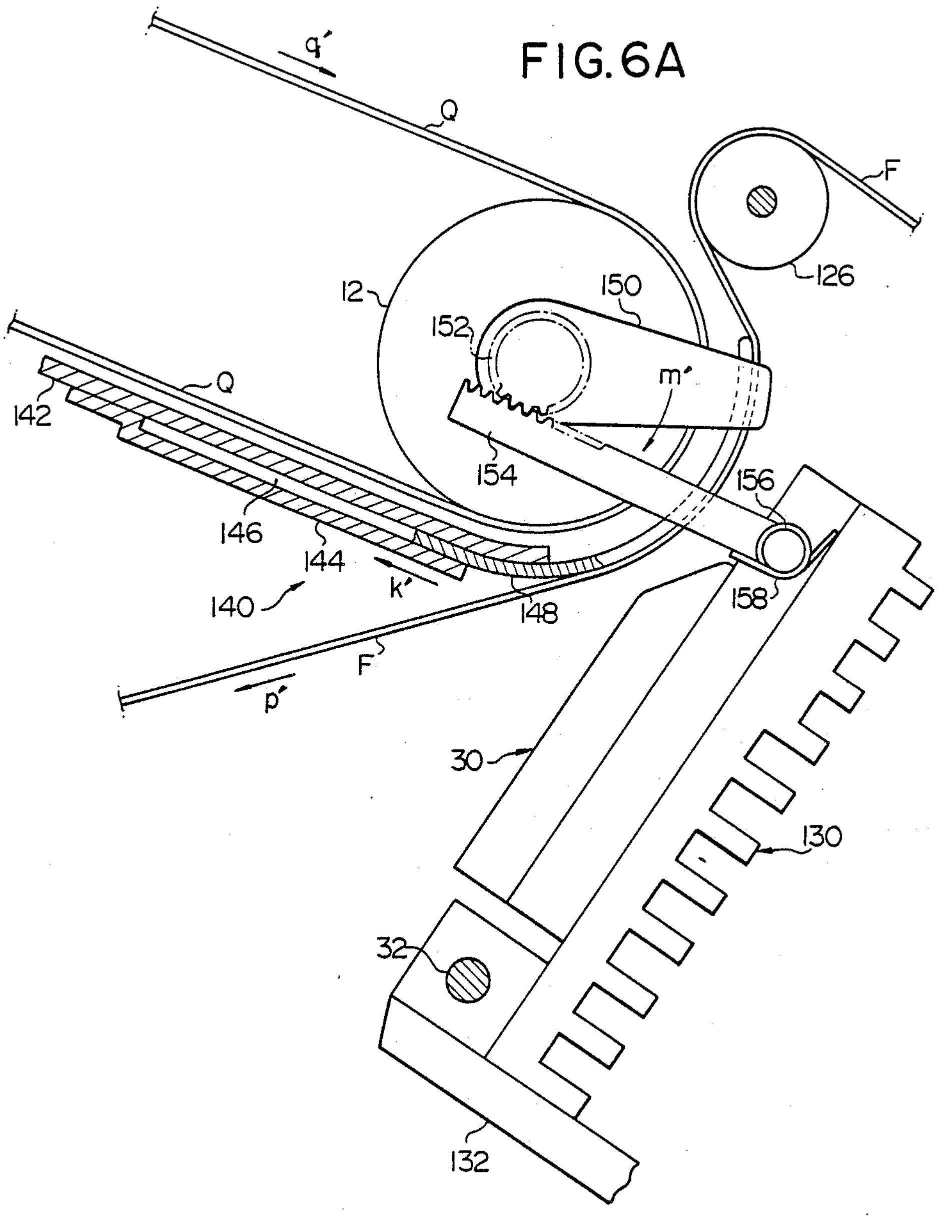
FIGS. 6A and 6B are fragmentary side elevation views each showing the arrangement of an ink film separating device which forms part of the printing apparatus illustrated in FIG. 5, the separating device being shown in inoperative and operative positions in FIGS. 6A and 6B, respectively
Figure 6B:
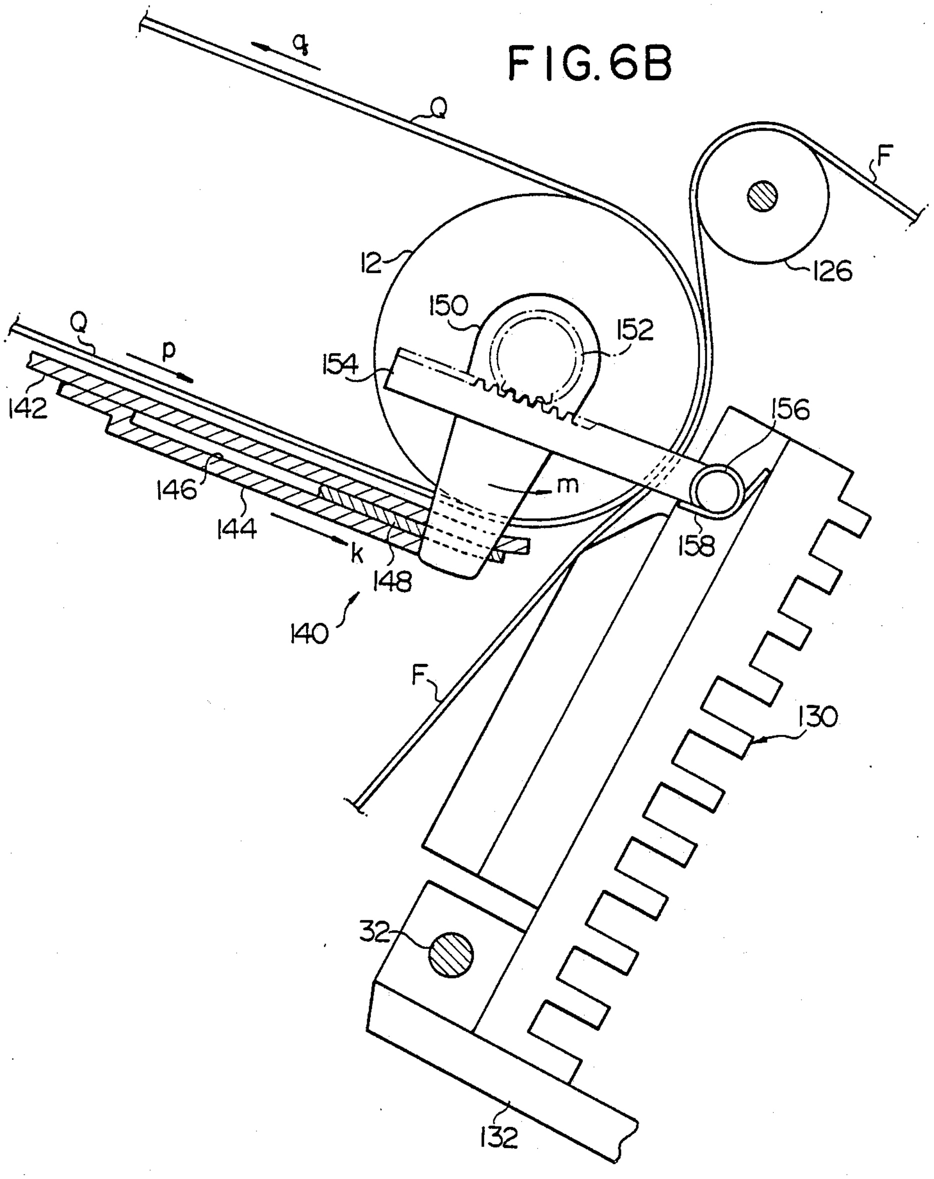

In the printing apparatus illustrated in FIG. 5, the thermal transfer mechanism comprising the platen roller 12 and film stripper roller 126 as above described further comprises a thermal print head 30 operative to press the ink film F against the print sheet Q on the peripheral surface of the platen roller 12 during each cycle of printing operation. The print head 30 is essentially similar to its equivalent in the embodiment described with reference to FIGS. 1A and 1B and is rockable on a pivot shaft 32 having a center axis parallel with and fixed with respect to the center axis of the roller shaft 14 carrying the platen roller 12. The print head 30 is thus pivotally movable about the center axis of the pivot shaft 32 in opposite directions indicated by arrows c and c'. The print head 30 is movable between an operative or first angular position close to the platen roller 12 as shown in FIGS. 5 and 6A and an inoperative or second angular position spaced apart from the platen roller 12 as shown in FIG. 6B. In the arrangement herein shown, the print head 30 has a heat sink portion 130 through which to dissipate heat.

Drive means is provided to drive the thermal print head 30 for rocking motion between these first and second angular positions thereof. Thus, the thermal print head 30 in the embodiment shown in FIG. 5 has further attached thereto a rocking member 132 extending perpendicularly in non-intersecting relationship to the center axis of the pivot shaft 32 carrying the print head 30. The rocking member 132 has carried in the vicinity of its leading end a cam follower element 134 which is held in slidable contact with a generally elliptical cam member 136. The elliptical cam member 136 is carried on a drive shaft 138 having a center axis which is parallel with and fixed with respect to the center axis of the pivot shaft 32 for the print head 30 and which is coincident with the center axis of the cam member 136. The drive shaft 138 carrying the cam member 136 is operatively connected to suitable drive means (not shown) and is to be driven for rotation in the direction of arrow at a predetermined velocity.

As the elliptical cam member 136 is thus driven for rotation in the direction of arrow j about the center axis of the drive shaft 138, the print head 30 as a whole is driven for rocking motion between its operative and inoperative or first and second angular positions about the center axis of the pivot shaft 32. The film stripper roller 126 being fixedly located with respect to the roller shaft 14 carrying the platen roller 12 as previously noted, the path of the ink film F in the arrangement herein shown remains unchanged irrespective of such rocking motions of the print head 30.

During each cycle of printing operation, the print head 30 is driven to turn in the direction of arrow c' to the first angular position close to the platen roller 12 as illustrated in FIG. 6A. In this instance, the ink film F engaged by the print head 30 has one of its colored areas pressed against the surface of the print sheet Q advancing through a print zone round the peripheral surface of the platen roller 12. A single-colored component of the multi-colored image to be finally reproduced are formed on the surface of the print sheet Q by transfer of an ink from the ink film which, in the arrangement herein shown, intervenes between the print sheet Q on the peripheral surface of the platen roller 12 and the array of the heater elements provided in the print head 30. Toward the end of the cycle of printing operation, the print head 30 is driven to turn in the direction of arrow c to the second angular position and is spaced apart from the platen roller 12 as illustrated in FIG. 6B.

The ink-film feeding means for the ink film F is operative to drive the ink film F to travel a predetermined distance in the direction of arrows r AND S during each of the three consecutive cycle of printing operation to reproduce a multi-color image on a particular defined area of the print sheet Q. Three colored areas of the ink film F are thus successively moved into registry with a particular defined area of the print sheet Q during the three consecutive cycles of printing operation. Each of the colored areas of the ink film F is pressed against the print sheet Q on the peripheral surface of the platen roller 12 by the aid of the film stripper roller 126 which is fixedly located with respect to the platen roller 12 a previously noted.

As will have been understood from the above description, the print-sheet feeding means provided in the embodiment under consideration is operative to drive the print sheet Q to move forwardly to a predetermined print-start position with respect to the platen roller 12 during a first cycle of printing operation for the printing of one of the single-color component of the whole multi-color image to be finally reproduced on a particular defined area of the print sheet Q. During second and third cycles of printing operation, the print-sheet feeding means drives the print sheet Q to move backwardly as indicated by arrows p' and q' until the defined area of the print sheet Q on which the single-colored image component has been printed resumes the initial print-position with respect to the platen roller 12. During these second and third cycles of printing operation are printed the remaining two single-color image components on the defined area of the print sheet Q. The print-sheet feeding means is thus operative to drive the print sheet Q to move forwardly to the print-start position with respect to the platen roller 12 during the first cycle of printing operation and backwardly to the print-start position during each of the second and third cycles of operation. While the print-sheet feeding means is operative to drive the print sheet Q to move backwardly to the print-start position during each of the second and third cycles of printing operation, the film feeding means for the ink film F is required to simply drive the ink film F to stepwise advance simply in the forward direction during each of the three consecutive cycles of operation to produce the whole multi-color image on the defined area of the print sheet Q.

In the embodiment shown in FIG. 5, there is further provided an ink film separating device 140 for separating the ink film F from the print sheet Q when the thermal print head 30 is turned to the second angular position spaced apart from the platen roller 12 toward the end of each cycle of printing operation.

Referring to FIGS. 6A and 6B, the ink film separating device 140 comprises a print-sheet guide plate 142 extending along a portion of the path of the print sheet Q toward the platen roller 12 and forwardly terminating below the platen roller 12. To the print-sheet guide plate 142 is securely attached a separator-strip guide plate 144 which is in part spaced apart from the print-sheet guide plate 142 to form a uniform gap 146 between the plates 142 and 144. The gap 146 thus formed between the print-sheet and separator-strip guide plates 142 and 144 provides a passageway extending in parallel the path of the print sheet Q toward the platen roller 12 and is forwardly open in the vicinity of the leading end of the print-sheet guide plate 142 as shown.

A flexible separator strip 148 is slidably received in the passageway 146 between the print-sheet and separator-strip guide plates 142 and 144. The separator strip 148 is slidable in a first direction to move outwardly from the passageway 146 as indicated by arrow k in FIG. 6A and a second direction to retract inwardly into the passageway 146 as indicated by arrow k' in FIG. 6B. The separator strip 148 is typically formed of any synthetic resin and is conditioned to have a tendency to warp arcuately about the center axis of the drive shaft 14 (FIG. 5) carrying the platen roller 12. Thus, the separator strip 148 is allowed to arcuately curve round the peripheral surface of the platen roller 12 when withdrawn outwardly from the passageway 146 between the guide plates 142 and 144 as shown in FIG. 6B and is caused to extend straight when retracted into the passageway 146 as shown in FIG. 6A. When moved outwardly from the passageway 146 between the guide plates 142 and 144, the separator strip 148 curved round the platen roller 12 has its leading end located in the neighborhood of the film stripper roller 126 and a trailing end portion retained in the passageway 146. When retracted into the passageway 146, the separator strip 148 has its leading end portion projecting forwardly out of the passageway 146.

The separator strip 148 is driven to move in the first or second direction k or k' by actuating means cooperative with the drive means implemented by the rocking member 132, cam follower element 134 and cam member 134. The actuating means comprises a rocking arm 150 carried on the drive shaft 14 (FIG. 5) carrying the platen roller 12. The rocking arm 150 is rotatable with respect to the drive shaft 14 and accordingly to the platen roller 12 about the center axis of the drive shaft 14 in opposite directions indicated by arrows m and m' in FIGS. 6A and 6B, respectively. The rocking arm 150 is secured in the vicinity of its leading end to a leading end portion of the separator strip 148. The separator strip 150 is thus driven to move in the first direction of arrow k or in the second direction of arrow k' as the rocking arm 150 is turned about the center axis of the drive shaft 14. Thus, the rocking arm 150 is rockable about the center axis of the drive shaft 14 between a first angular position having the separator strip 148 retracted into the passageway 146 between the guide plates 142 and 144 as shown in FIG. 6A and a second angular position having the separator strip 148 withdrawn from the passageway 146 as shown in FIG. 6B.

To the rocking arm 150 is securely attached a pinion gear 152 rotatable with the rocking arm 150 about the center axis of the drive shaft 14. The pinion gear 152 is in mesh with an elongated rack member 154 extending in a direction perpendicular in non-intersecting relationship to the center axis of the drive shaft 14. The rack member 154 is pivotally connected at one end to the thermal print head 30 by means of a pivot shaft 156 projecting from the print head 30 and is urged by suitable biasing means to turn about the pivot shaft 156 in a direction to remain in mesh with the pinion gear 152. In the arrangement herein shown, such biasing means comprises a helical torsion spring 158 supported on the pivot shaft 156 and anchored at one end on the rack member 154 and at the other o the print head 30.

In operation, the rotation of the elliptical cam member 136 about the center axis of the drive shaft 138 causes rocking motions of the thermal print head 30 in the directions of arrows c and c' about the center axis of the pivot shaft 32 as has been described with reference to FIG. 5. When the print head 30 is driven to turn in the direction of arrow c' toward its first angular position close to the platen roller 12, the rack member 154 connected to the print head 30 is longitudinally moved in a direction to cause the rocking arm 150 to turn in the direction of arrow m' through engagement between the rack member 154 and pinion gear 142. The separator strip 148 which has been moved outwardly from the passageway 146 between the guide plates 142 and 144 by means of the rocking arm 150 is caused to retract into the passageway 146 as indicated by arrow k'. The separator strip 148 being thus withdrawn from a position intervening between the platen roller 12 and the print head 30, the print head 30 is allowed to reach the first angular position pressing the ink film F into contact with the print sheet Q on the platen roller 12 as shown in FIG. 6A.

The print head 30 is then driven to turn in the direction of arrow c from the first angular position toward the second angular position spaced apart from the platen roller 12. The rack member 154 connected to the print head 30 is now longitudinally moved in a direction to cause the rocking arm 150 to turn in the direction of arrow m through engagement between the rack member 154 and pinion gear 142. The separator strip 148 which has been retracted into the passageway 146 between the guide plates 142 and 144 is accordingly caused to move outwardly from the passageway 146 as indicated by arrow k. The separator strip 148 being thus moved to a position intervening between the platen roller 12 and the print head 30, the ink film F which has been disengaged from the print head 30 is received on the separator strip 148 arcuately curved round the platen roller 12 and is assuredly separated from the print sheet Q on the peripheral surface of the platen roller 12 as will be seen from FIG. 6B. The ink film F thus separated from the print sheet Q is prevented from being brought into contact with the print sheet S while the print sheet Q is being driven to travel backwardly on the platen roller 12 toward the end of each cycle of printing operation.

As will have been understood from the foregoing description, the third preferred embodiment of the present invention is inter alia characterized in that the ink film F is allowed to remain on the print sheet Q temporarily after the ink film F has been released from the thermal print head 30 and is assuredly isolated from the print sheet Q and is prevented from being accidentally brought into contact with the print sheet while the print sheet is being moved back to the initial print-start position with respect to the platen roller 12.

What is claimed is:

1. A thermal transfer printing apparatus comprising (a) a platen roller rotatable in a first direction and a second direction opposite to the first direction, (b) first feeding means for feeding a recording medium on said platen roller, (c) second feeding means for feeding a continuous length of carrier medium in conjunction with said recording medium on said platen roller so that the carrier medium may be in contact with the recording medium, said carrier medium having a succession of colored areas carrying differently colored inks, (d) a thermal print head movable between an inoperative position spaced apart from said platen roller and an operative position having said carrier medium pressed against the recording medium on said platen roller and operative to form an image on said recording medium by thermal transfer of an ink from one of said colored areas of said carrier medium to the recording medium, (e) a guide member movable between a first position close to said platen roller and a second position spaced apart from the platen roller, the guide member in said first position forming a passageway through which said recording medium is to be guided to travel along a predetermined path with respect to said platen roller, and (f) means for coupling said guide member and said thermal print head together so that the guide member is moved to said first position in response to movement of said thermal print head to said inoperative position and is moved to said second position in response to movement of said thermal print head to said operative position.

2. A thermal transfer printing apparatus as set forth in claim 1, in which said guide member is operative to intervene between said recording medium and said carrier medium for separating the recording medium and carrier medium from each other when moved from said second position to said first position.

3. A thermal transfer printing apparatus comprising (a) a platen roller rotatable in a first direction and a second direction opposite to the first direction, (b) first feeding means for feeding a recording medium on said platen roller, (c) second feeding means for feeding a continuous length of carrier medium in conjunction with said recording medium on said platen roller so that the carrier medium may be in contact with the recording medium, said carrier medium having a succession of colored areas carrying differently colored inks, (d) a thermal print head movable between an inoperative position spaced apart from said platen roller and a operative position having said carrier medium pressed against the recording medium on said platen roller and operative to form an image on said recording medium by thermal transfer of an ink from one of said colored areas of said carrier medium to the recording medium, (e) a guide member movable between a first position retracted from between said platen roller and said thermal print head and a second position intervening between said platen roller and said thermal print head and between said recording medium and said carrier medium for separating the recording medium and carrier medium from each other, and (f) means for coupling said guide member and said thermal print head together so that the guide member is moved to said first position in response to movement of said thermal print head to said operative position and is moved to said second position in response to movement of said thermal print head to said inoperative position.

4. A multi-color thermal transfer printing apparatus (a) image forming means movable to and from an operative position for forming, during each cycle of operation, a single-colored image on a recording medium by thermal transfer of a colored toning material from a carrier medium having a series of colored areas each carrying a single-colored image transfer material, (b) first feeding means for driving said recording medium to move either in a first direction or in a second direction opposite to the first direction to a predetermined print-start position with respect to said image forming means, (c) second feeding means for driving said carrier medium to move to a position having one of said colored areas located in conjunction with said recording medium moved to said print-start position, (d) guide means movable to and from an operative position for guiding the movement of said recording medium to said print-start position in said first direction or in said second direction, (e) drive means for driving said image forming means into said operative position thereof and said guide means out of said operative position thereof and alternately driving said image forming means out of said operative position thereof and said guide means into said operative position thereof.

5. A multi-color thermal transfer printing apparatus as set forth in claim 4, in which said first and second feeding means are respectively operative to drive said recording medium and carrier medium to move away from said image forming means toward the end of each cycle of operation, said second feeding means comprising a stripper roller rotatable about an axis fixed with respect to said image forming means, said stripper roller being operative to guide said carrier medium to move away from said recording medium when the recording medium and carrier medium are driven to move away from said image forming means by said first and second feeding means, respectively.

6. A multi-color thermal transfer printing apparatus as set forth in claim 4, in which said drive means comprises (e/1) a first actuating member engaging said image forming means and having a predetermined position moving the image forming means to said operative position thereof, (e/2) cam means engaging said first actuating member and having a predetermined position having the first actuating member moved to said predetermined position thereof, (e/3) a second actuating member engaging said guide means and said cam means and movable in a direction (h) moving the guide means to said operative position thereof in response to movement of said cam means away from the predetermined position thereof, and (e/4) engagement means movable with said cam means and engageable with said second actuating member, the engagement means being operative to transmit the movement of said cam means away from the predetermined position thereof at a predetermined timing after the cam means has assumed said predetermined position thereof.

7. A multi-color thermal transfer printing apparatus as set forth in claim 6, in which said cam means comprises a cam member engaging said first actuating member and rotatable in a predetermined direction about a fixed axis of rotation, said cam member being rotatable about said axis of rotation through a predetermined rotational position having said first actuating member moved to said predetermined position thereof.

8. A multi-color thermal transfer printing apparatus as set forth in claim 7, in which said cam member is formed with a closed loop of cam groove having a substantially semicircular portion extending about said axis of rotation through a central angle of more than 180 degrees and a protuberant lobe portion protruding radially outwardly from the opposite ends of said semicircular portion and having a vertex centrally located in the lobe portion, said cam means further comprising a cam follower element engaging said first actuating member and movable along said cam groove for moving the first actuating member to said predetermined position thereof in response to rotation of the cam member to a rotational position having said cam follower element located at said vertex in said cam groove.

9. A multi-color thermal transfer printing apparatus as set forth in claim 8, in which said engagement means comprises an engagement element fast on said cam member and located at a predetermined central angle to said vertex of the protuberant lobe portion of said cam groove, said second actuating member being engageable with said engagement element and rockable about an axis fixed with respect to the axis of rotation of said cam member to and from an angular position engaged by said engagement member and having said guide means moved to said operative position thereof in response to rotation of said cam member away from said rotational position having said cam follower element located at said vertex in said cam groove.

10. A multi-color thermal transfer printing apparatus as set forth in claim 9, in which said first actuating member has an elongated slot having slidably received therein a slide member operatively connected to said image forming means and movable in a predetermined direction within said slot in response to movement of said first actuating member to said predetermined position thereof.

11. A multi-color thermal transfer printing apparatus as set forth in claim 9, in which said drive means further comprises (e/5) biasing means urging said guide means to move away from said operative position thereof, and (e/6) a flexible line anchored at one end to said second actuating member and at the other to said guide means for transmitting the movement of said second actuating member to and from said angular position to said guide means so that, when the second actuating member is engaged by said engagement member, said guide means is moved to said operative position thereof in response to rotation of said cam member away from said rotational position having said cam follower element located at said vertex in said cam groove.

12. A multi-color thermal transfer printing apparatus as set forth in claim 4, in which said drive means comprises (e/1) an actuating member engaging said image forming means and having a predetermined position moving the image forming means to said operative position thereof, (e/2) cam means engaging said actuating member and having a predetermined position having the actuating member moved to said predetermined position thereof, (e/3) first biasing means urging said guide means to move away from said operative position thereof, (e/4) a timing control member engaging said actuating member, (e/5) second biasing means operatively intervening between said timing control member and said guide means and urging said guide means to move toward said operative position thereof, said timing control member being movable between a first position having said second biasing means overpowered by said first biasing means for allowing said guide means to move away from the operative position thereof and a second position having said first biasing means overpowered by said second biasing means for allowing said guide means to move to the operative position thereof, and (e/6) lost-motion cam means for producing a lost motion in the movement of said timing control member between said first and second positions thereof.

13. A multi-color thermal transfer printing apparatus as set forth in claim 12, in which said lost-motion cam means comprises an elongated slot formed in said timing control member and elongated substantially in the direction of movement of the timing control member between said first and second positions thereof, and a slide member slidably received in said slot and operatively connected to said image forming means, said slide member being movable within said slot in response to movement of said timing control member between the first and second positions thereof.

14. A multi-color thermal transfer printing apparatus (a) image forming means movable to and from an operative position for forming, during each cycle of operation, a single-colored image on a recording medium by thermal transfer of a colored toning material from a carrier medium having a series of colored areas each carrying a single-colored image transfer material, (b) first feeding means for driving said recording medium to move either in a first direction or in a second direction opposite to the first direction to a predetermined print-start position with respect to said image forming means, (c) second feeding means for driving said carrier medium to move to a position having one of said colored areas located in conjunction with said recording medium moved to said print-start position, (d) drive means for driving said image forming means alternately into and out of said operative position thereof, and (e) separating means (140) responsive to movement of said image forming means toward and away from said operative position thereof, said separating means being operative to guide said carrier medium to move at a spacing from said first feeding means in response to the movement of said image forming means away from said operative position thereof.

15. A multi-color thermal transfer printing apparatus as set forth in claim 14, in which said first and second feeding means are respectively operative to drive said recording medium and carrier medium to move away from said image forming means toward the end of each cycle of operation, said second feeding means comprising a stripper roller rotatable about a fixed axis, said stripper roller being operative to guide said carrier medium to move away from said recording medium when the recording medium and carrier medium are driven to move away from said image forming means by said first and second feeding means, respectively.

16. A multi-color thermal transfer printing apparatus as set forth in claim 15, in which said separating means comprises (e/1) means forming a passageway extending substantially in parallel with a path of said recording medium to move toward said print-start position in said first direction, (e/2) a flexible separator strip movable through said passageway between a first position having a major portion located in said passageway and a second position extending outwardly from said passageway, said separator strip having a tendency to deform along a path of the recording medium moving away from said print-start position in said first direction or backwardly toward said print-start position in said second direction, and (e/3) actuating means cooperative with said drive means for actuating said separator strip to move alternately to said first and second positions thereof respectively in response to movement of said image forming means driven by said drive means to move into and out of said operative position thereof.

(e/3/1) a rocking arm rockable in opposite directions about a fixed axis of rotation between a first angular position having the separator strip moved to said first position thereof and a second angular position having the separator strip moved to said second position thereof, (e/3/2) a pinion gear rotatable with said rocking arm about the axis of rotation of the rocking arm, (e/3/3) an elongated rack member held in mesh with said pinion gear and pivotally movable on said image forming means the rack member being operative to convert the movement of said image forming means into said operative position thereof into rocking motion of said rocking member to said first angular position thereof and convert the movement of said image forming means out of said operative position thereof into rocking motion of said rocking member to said second angular position thereof.

* * * * *